United States Patent
Naguib et al.

(10) Patent No.: US 10,101,196 B2
(45) Date of Patent: Oct. 16, 2018

(54) DEVICE FOR UAV DETECTION AND IDENTIFICATION

(71) Applicant: QUALCOMM Incorporated, San Diego, CA (US)

(72) Inventors: Ayman Naguib, Cupertino, CA (US); Nayeem Islam, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 15/046,390

(22) Filed: Feb. 17, 2016

(65) Prior Publication Data

US 2017/0234724 A1  Aug. 17, 2017

(51) Int. Cl.
| | |
|---|---|
| G01S 5/00 | (2006.01) |
| G01H 3/08 | (2006.01) |
| G01S 5/18 | (2006.01) |
| G01V 1/00 | (2006.01) |
| G08B 13/00 | (2006.01) |

(52) U.S. Cl.
CPC ............... G01H 3/08 (2013.01); G01S 5/18 (2013.01); G01S 5/186 (2013.01); G01V 1/001 (2013.01); G08B 13/00 (2013.01)

(58) Field of Classification Search
CPC ........ G01S 7/521; G01S 15/8902; G01S 3/80; G10K 11/006; G10K 11/32; B06B 1/0611; B06B 1/0688
See application file for complete search history.

(56) References Cited

U.S. PATENT DOCUMENTS

| | | |
|---|---|---|
| 9,087,451 B1 | 7/2015 | Jarrell |
| 9,651,649 B1* | 5/2017 | Salloum .................. G01S 3/802 |
| 2008/0150787 A1 | 6/2008 | Cummings et al. |
| 2011/0246402 A1* | 10/2011 | Burman ............ G08B 13/1672 |
| | | 706/14 |
| 2015/0302858 A1 | 10/2015 | Hearing et al. |
| 2017/0234966 A1 | 8/2017 | Naguib et al. |

OTHER PUBLICATIONS

Dedrone, "Multi-Sensor Drone Detection Software," 2015, 6 pages.
Pham T., et al., "TTCP AG-6: Acoustic Detection and Tracking of UAVs," Proceedings of SPIE 5417, 2004, vol. 5417, pp. 24-30.
Shi W., et al., "Detecting, Tracking, and Identifying Airborne Threats with Netted Sensor Fence," Sensor Fusion—Foundation and Applications, 2011, 21 pages.

(Continued)

Primary Examiner — Hovhannes Baghdasaryan
(74) Attorney, Agent, or Firm — Paradice and Li LLP

(57) ABSTRACT

Apparatuses and methods are described herein for identifying a Unmanned Aerial Vehicle (UAV), including, but not limited to, determining a first maneuver type, determining a first acoustic signature of sound captured by a plurality of audio sensors while the UAV performs the first maneuver type, determining a second acoustic signature of sound captured by the plurality of audio sensors while the UAV performs a second maneuver type different from the first maneuver type, determining an acoustic signature delta based on the first acoustic signature and the second acoustic signature, and determining an identity of the UAV based on the acoustic signature delta.

29 Claims, 11 Drawing Sheets

(56) References Cited

OTHER PUBLICATIONS

Von Technology-Guerilla, "Open Source DroneShield Kit Alerts You of Snooping UAVs," May 10, 2013, 4 pages.
Teng J., "Prediction-Based Proactive Cluster Target Tracking Protocol for Binary Sensor Networks," Signal Processing and Information Technology, 2007 IEEE International Symposium on, IEEE, Piscataway, NJ, USA, Dec. 15, 2007, XP831234284, pp. 234-239.
Henrich W., et al.,"Data Fusion for the New German F124 Frigate Concept and Architecture," Information Fusion, 2003 Proceedings of the Sixth International Conference of, XP855427453, Jan. 1, 2003, pp. 1342-1349.
Sineglazov V.M., "Multi-Functional Integrated Complex of Detection and Identification of UAVs," IEEE International Conference Actual Problems of Unmanned Aerial Vehicles Developments, Oct. 13, 2015, XP032825774, pp. 320-323.

\* cited by examiner

DEVICE FOR UAV DETECTION AND IDENTIFICATION

BACKGROUND

A variety of Unmanned Aerial Vehicles (UAVs) have been developed, including Remote Control (RC) planes for the hobbyists, and more advanced "drones" or UAVs. Various UAV configurations and features, including for example, various "quadcopter" or four-rotor configurations, have been developed for various hobby, commercial, or military applications.

As UAVs become more sophisticated and more easily accessible, unregulated use of UAVs may pose security, safety, and privacy concerns. For example, unregulated use of UAVs can include invasion of privacy, espionage, smuggling, and the like. In certain contexts, detection of UAVs can be challenging, given that UAVs can be much smaller than manned aircrafts, can fly at low altitudes, and can maneuver differently than manned aircrafts. Standard radar and other conventional technologies for detecting larger, manned aircrafts may not be well-suited for detecting UAVs. For example, pulsed radars cannot detect UAVs as the pulsed radars have a minimum range and resolution, severely limiting detection and identification of small UAVs. Some existing solutions, including micro-Synthetic Aperture Radar (SAR), Nano-SAR, and Miniature Radar Altimeter (MRA), were designed for remote sensing applications instead of detecting and identifying UAVs, and additional work is necessary before such solutions can be used reliably to detect small UAVs.

SUMMARY

Various embodiments relate to detecting and identifying Unmanned Aerial Vehicles (UAVs). The detection and identification embodiments can be implemented to distinguish a UAV from other UAVs or other flying objects (such as, but not limited to, avian animals). An approaching UAV may generate acoustic sound (via rotors) that may correspond to a particular acoustic signature. An acoustic signature delta may be determined from a first acoustic signature and a second acoustic signature. The first acoustic signature may correspond to a first maneuver of the UAV. The second acoustic signature may correspond to a second maneuver of the UAV. The acoustic signature delta may be correlated with acoustic signature deltas of various types of UAVs for determining a matching UAV identity. The UAV may accordingly be identified based on the correlation.

In a similar fashion, an approaching UAV may exhibit motion patterns (in a video stream) that are specifically distinguishable from the motion patterns of other flying objects (such as, but not limited to, avian animals). Those motion patterns may correspond to a particular maneuver performed by the UAV.

In further embodiments, in addition to using the acoustic-based identification process and a video/image-based identification process, a fusion engine may correlate one or more of acoustic sound data, video/image data, infrared/thermal data, radar data, or intercepted wireless control communication data associated with the approaching UAV to determine the identity of the approaching UAV. Particularly, the fusion engine may correlate the different types of data based on timestamps to determine the identity of the UAV with higher confidence level.

In some embodiments, a method for identifying a Unmanned Aerial Vehicle (UAV) includes determining a first maneuver type, determining a first acoustic signature of sound captured by a plurality of audio sensors while the UAV performs the first maneuver type, determining a second acoustic signature of sound captured by the plurality of audio sensors while the UAV performs a second maneuver type different from the first maneuver type, determining an acoustic signature delta based on the first acoustic signature and the second acoustic signature, and determining an identity of the UAV based on the acoustic signature delta.

In some embodiments, each of the first acoustic signature and the second acoustic signature is determined based on sound corresponding to the first acoustic signature and the second acoustic signature of the UAV captured with the plurality of audio sensors.

According to some embodiments, the plurality of audio sensors is configured as a microphone array.

In some embodiments, determining the first maneuver type includes determining a first relative position and orientation of the UAV based on sound captured by the plurality of audio sensors, determining a second relative position and orientation of the UAV based on the sound captured by the plurality of audio sensors, and determining the first maneuver type based on the first relative position and orientation of the UAV and the second relative position and orientation of the UAV.

In some embodiments, determining the second maneuver type includes determining a third relative position and orientation of the UAV based on sound captured by the plurality of audio sensors, determining a fourth relative position and orientation of the UAV based on the sound captured by the plurality of audio sensors, and determining the second maneuver type based on the third relative position and orientation of the UAV and the fourth relative position and orientation of the UAV.

In various embodiments, the first maneuver type associated with the first acoustic signature is determined based on motion vectors of the UAV captured with at least one visual sensor.

In some embodiments, the method further includes determining at least one timestamp associated with the first maneuver type and determining the first acoustic signature based on the at least one timestamp.

According to some embodiments, the second maneuver type associated with the second acoustic signature is determined based on motion vectors of the UAV captured by at least one visual sensor.

In some embodiments, the method further includes determining at least one timestamp associated with the second maneuver type, and determining the second acoustic signature based on the at least one timestamp.

In some embodiments, each of the first maneuver type and the second maneuver type includes one or more of moving in a straight line, banking left, banking right, ascending, descending, rolling, pitching, or yawing.

In some embodiments, the UAV is identified based on the acoustic signature delta by correlating the acoustic signature delta with a plurality of stored acoustic signature deltas associated with a plurality of UAV identities.

In some embodiments, the method further includes determining at least one motion vector for the UAV, determining first identity data identifying the UAV based on the acoustic signature delta, determining second identity data identifying the UAV based on the at least one motion vector, and correlating the first identity data with the second identity data to determine the identity of the UAV.

In some embodiments, determining the at least one motion vector for the UAV includes receiving video stream data corresponding to the UAV from at least one visual sensor and determining the at least one motion vector of the UAV based on the video stream data.

In some embodiments, determining the second identity data based on the at least one motion vector includes correlating the at least one motion vector with a plurality of stored motion vectors associated with a plurality of UAV identities.

In some embodiments, the first identity data and the second identity data are time-aligned for the correlation based on a timestamp associated with the first identity data and a timestamp associated with the second identity data.

In some embodiments, the method further includes determining third identity data based on radar data associated with the UAV and correlating one or more of the first identity data, the second identity data, and the third identity data to determine the identity of the UAV.

In some embodiments, the method further includes determining third identity data based on wireless communication signals associated with the UAV and correlating one or more of the first identity data, the second identity data, and the third identity data to determine the identity of the UAV.

In some embodiments, the method further includes determining third identity data based on infrared or thermal data associated with the UAV and correlating one or more of the first identity data, the second identity data, and the third identity data to determine the identity of the UAV.

In some embodiments, the method further includes determining information relating to the UAV, determining first identity data identifying the UAV based on the acoustic signature delta, determining second identity data identifying the UAV based on the determined information, and correlating the first identity data with the second identity data to determine the identity of the UAV.

In some embodiments, the identity of the UAV includes information relating to a manufacturer, model, shape, size, or number of rotors of the UAV.

In some embodiments, the identity of the UAV includes information relating to characteristics of the UAV.

In some embodiments, an identification apparatus configured to determine an identity associated with a UAV, the identification apparatus including, an acoustic-based identification apparatus, which includes a first processor configured to determine a first maneuver type, determine a first acoustic signature of sound captured by a plurality of audio sensors while the UAV performs the first maneuver type, determine a second acoustic signature of sound captured by the plurality of audio sensors while the UAV performs a second maneuver type different from the first maneuver type, determine an acoustic signature delta based on the first acoustic signature and the second acoustic signature, and determine the identity of the UAV based on the acoustic signature delta.

In some embodiments, the identification apparatus further includes a video/image-based identification apparatus including a visual sensor array configured to capture visual data corresponding to the UAV and a second processor configured to determine at least one motion vector associated with motion of the UAV from the visual data and output second identity data identifying the UAV based on the at least one motion vector, and a fusion engine configured to identify the UAV based on both the first identity data and the second identity data.

In some embodiments, the first maneuver type is identified based on the at least one motion vector of the UAV captured with the visual sensor array.

In some embodiments, the first processor is further configured to determine the first maneuver type by determining a first relative position and orientation of the UAV based on sound captured by a plurality of audio sensors, determining a second relative position and orientation of the UAV based on the sound captured by the plurality of audio sensors, and determining the first maneuver type based on the first relative position and orientation of the UAV and the second relative position and orientation of the UAV.

In some embodiments, the first processor identifies the UAV based on the acoustic signature delta by correlating the acoustic signature delta with a plurality of stored acoustic signature deltas associated with a plurality of UAV identities.

In some embodiments, the acoustic-based identification apparatus further includes an audio sensor array comprising the plurality of audio sensors configured to capture the sound generated by the UAV.

According to various embodiments, a non-transitory computer-readable medium containing processor-readable instructions such that, when executed, cause a processor of an identification apparatus to perform a process to identify a UAV, the process including determining a first maneuver type, determining a first acoustic signature of sound captured by a plurality of audio sensors while the UAV performs the first maneuver type, determining a second acoustic signature of sound captured by the plurality of audio sensors while the UAV performs a second maneuver type different from the first maneuver type, determining an acoustic signature delta based on the first acoustic signature and the second acoustic signature, and determining an identity of the UAV based on the acoustic signature delta.

According to some embodiments, an apparatus configured to determine an identity of a UAV includes means for determining a first maneuver type, means for determining a first acoustic signature of sound captured by a plurality of audio sensors while the UAV performs the first maneuver type, means for determining a second acoustic signature of sound captured by the plurality of audio sensors while the UAV performs a second maneuver type different from the first maneuver type, means for determining an acoustic signature delta based on the first acoustic signature and the second acoustic signature, and means for determining an identity of the UAV based on the acoustic signature delta.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
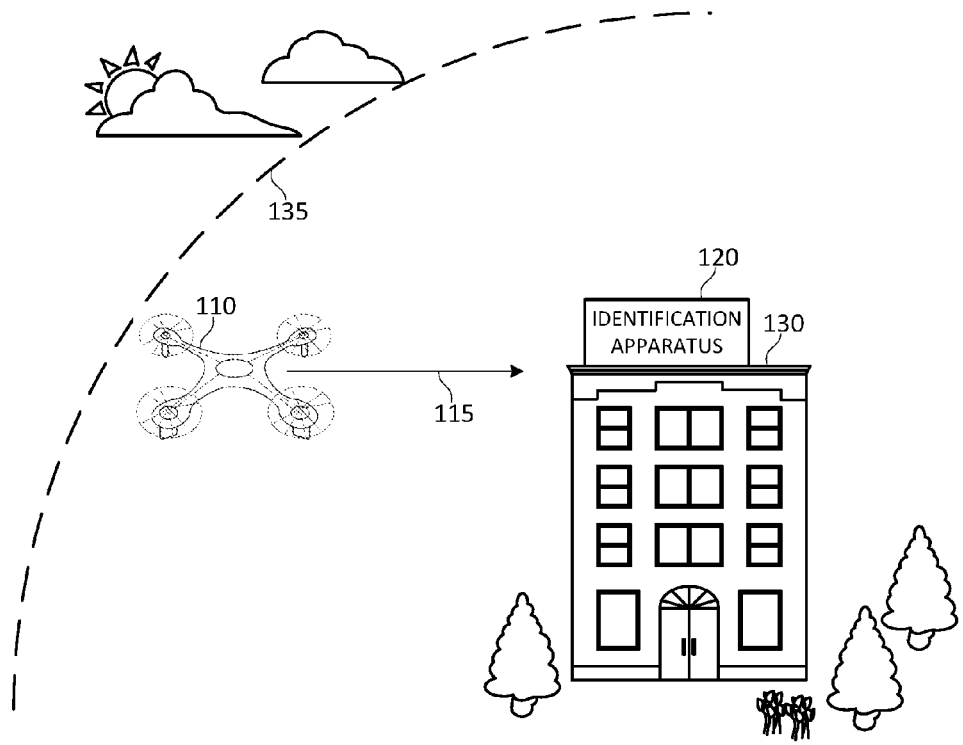
FIG. 1 is a diagram illustrating an example of an interaction between a Unmanned Aerial Vehicle (UAV) and an identification apparatus arranged on a structure according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some embodiments for detecting and identifying a Unmanned Aerial Vehicle (UAV) implement acoustic signature deltas based on different maneuvers taken by the UAVs. An array of microphones or other audio sensors may be arranged on a building, structure, or in/around a defined area to detect audio signals from an approaching UAV. The microphone array may capture audio signals of the UAV while the UAV performs two or more maneuvers such as, but not limited to, moving in a straight line, rolling, pitching, yawing, ascending, descending, left-bank turn, right-bank turn, a combination thereof, and/or the like. The audio data captured by the array of spaced-apart audio sensors may allow detection of a distance, angle, and elevation with respect to the array (collectively, the position of the UAV) and orientation of the UAV using triangulation or trilateration. The position and the orientation may collectively be referred to as the pose of the UAV. Based on the poses of the UAV at different times, various maneuvers of the UAV may be determined. While performing the maneuvers, the acoustic signatures generated by the UAV may vary. An acoustic signature may be a distinct frequency and amplitude pattern associated with a particular maneuver.

Thus, an acoustic signature delta may be determined for the UAV. The acoustic signature delta may be any parameter or function representing the difference between two acoustic signatures associated with different maneuvers. The different maneuvers may be performed sequentially in time. The acoustic signature delta for a particular UAV may be different from those of UAVs made by different manufacturers, UAVs of different models made by the same manufacturer, a same UAV under a different condition (e.g., carrying a different payload). Generally, UAVs of different sizes, shapes, rotor types and/or numbers of rotors may produce different acoustic signature deltas. However, each UAV of the same manufacturer, model, size, shape, rotor type and/or numbers of rotors may produce the same or substantially the same acoustic signature deltas. Embodiments involve providing a database of acoustic signature deltas each corresponding to a known UAV identity. The UAV identity may be defined by one or more of manufacturers, models, sizes, shapes, rotor types, numbers of rotors, or other characteristics.

A processor may be configured to determine a correlation (proximity or similarity) between the acoustic signature delta and the stored acoustic signature deltas. From among the stored acoustic signature deltas, a closest match may be determined. The approaching UAV may accordingly be identified to be the UAV identity associated with the closest match.

Further embodiments involve providing an array of spaced visual sensors (e.g., video cameras, infrared cameras, or the like) to capture video streams (or images) of the approaching UAV. A database may include motion information relating to the motion that different UAVs make when performing one or more specific maneuvers such as, but not limited to, moving in a straight line, rolling, pitching, yawing, ascending, descending, left bank turn, right bank turn, a combination thereof, and/or the like. The motion (as defined by at least one motion vector, angle, amount of pitch, yaw, roll, or the like) of a UAV corresponding to a particular maneuver may differ among different types of UAVs, but can be the same or substantially the same for UAVs of the same type when performing the same maneuver. The video data may define the poses of the UAV, thus allowing the processor to determine the maneuver of the UAVs based on the defined poses. The poses and the maneuvers determined using the video data may be associated with audio data (e.g., the acoustic signatures) through timestamps.

In such embodiments, the processor may first analyze the motion information (e.g., the motion vectors of the identified moving object in the video stream) to determine whether the identified object corresponds to an object other than a UAV (e.g., to determine whether the object is an avian animal). If the processor determines that the identified object is indeed a UAV, the processor may then proceed to compare the motion information (e.g., the motion vectors) of the approaching UAV with stored motion information (stored motion vectors) to determine a correlation. The UAV identity associated with the stored motion information that best correlates with the motion information of the approaching UAV may be selected as the identity for the approaching UAV.

A fusion identification apparatus combining the audio and video data detection methods described herein may greatly increase the confidence level of proper identification. The identification based on audio signals and the identification based on the video signals may be time-aligned using timestamps. The audio signals and the video signals corresponding to the same timestamp may be used to determine the identity of the UAV. For example, the identity of the approaching UAV may be determined as the result of a weighted correlation based on the acoustic signature delta and the motion vectors. The fusion identification apparatus may likewise correlate additional data to increase the confidence level. The additional data may include radar data, intercepted wireless communication signals, infrared data, or the like. Accordingly, the approaching UAV may be distinguished from other UAVs and/or from other non-UAV flying objects. In further or alternative embodiments, other sensors and/or other devices that provide information about the approaching UAV may be implemented in the fusion identification apparatus to increase the confidence level of proper identification of the UAV.

FIG. 1 is a diagram illustrating an example of an interaction between a UAV 110 and an identification apparatus 120 arranged on a structure 130 according to various embodiments. Referring to FIG. 1, the structure 130 may be any suitable building, wall, or geographical location having the identification apparatus 120 installed for UAV detection and identification purposes. The structure 130 may have a height (in case of a building or hill), or the structure 130 may be leveled (in case of a parking lot or sports field).

The identification apparatus 120 may be provided on any part of the structure 130 or adjacent to the structure 130. In further embodiments, a plurality of identification apparatuses such as, but not limited to, the identification apparatus 120 may be provided on or around the structure 130, or throughout an area associated with the structure 130. Illustrating with a non-limiting example, when the structure 130 is a building, the identification apparatus 120 (particularly audio sensors 210a-210n of FIG. 2A) may be arranged on a roof, exterior wall, balcony, window, or door of the structure 130. In additional non-limiting examples, the identification apparatus 120 may be provided on the ground or on another structure (similar to the structure 130) proximal to (within 5 m, 10 m, 20 m, or the like) the structure 130.

The UAV 110 may be moving along a forward direction 115 toward or in the general direction of the structure 130 and/or the identification apparatus 120. The UAV 110 may be within an identification boundary 135. The identification boundary 135 may be an effective boundary within which the identification apparatus 120 can appropriately identify the approaching UAV 110. For example, the identification boundary 135 may correspond to the effective detection distance of various sensors used in the identification apparatus 120 as described herein.

Figure 2A:
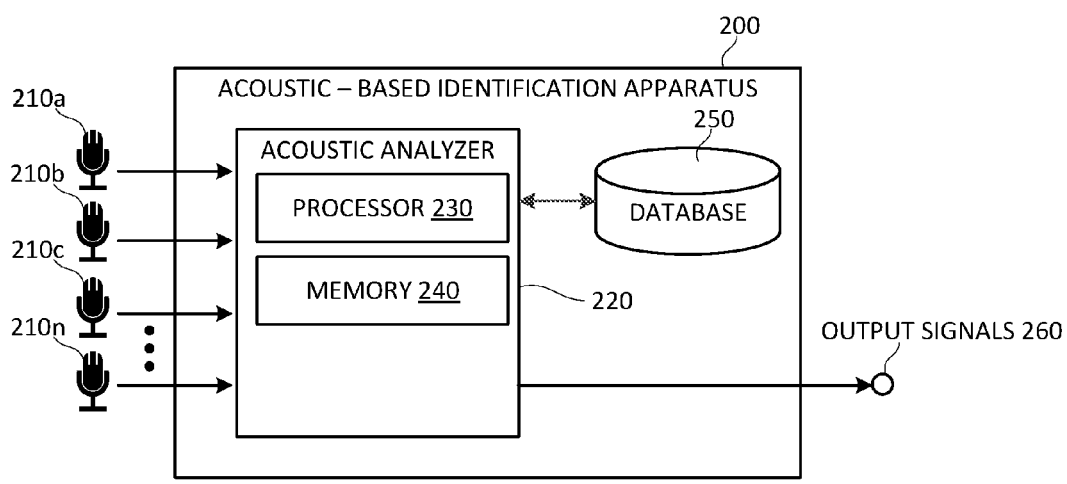
FIG. 2A is a schematic diagram illustrating an example of an acoustic-based identification apparatus according to various embodiments.

FIG. 2A is a schematic diagram illustrating an example of an acoustic-based identification apparatus 200 according to various embodiments. Referring to FIGS. 1-2A, the acoustic-based identification apparatus 200 may be an example of the identification apparatus 120 in some embodiments. In various embodiments, the acoustic-based identification apparatus 200 may be a part of the identification apparatus 120, which may include additional elements using different types of sensors than those of the acoustic-based identification apparatus 200. The acoustic-based identification apparatus 200 may include at least a plurality of audio sensors 210a-210n, an acoustic analyzer 220, and a database 250. The components of the identification apparatus 120 other than the audio sensors 210a-210n may be provided at one or more locations other than the location of the audio sensors 210a-210n.

The audio sensors 210a-210n may be configured to capture audio signals from the approaching UAV 110 (e.g., within the identification boundary 135). Particularly, the rotor acoustic noise, among other types of audio signals generated by the UAV 110 may be captured by the audio sensors 210a-210n. In some embodiments, one or more of the audio sensors 210a-210n may be integrated with the rest of the acoustic-based identification apparatus 200 or otherwise housed inside of a housing of the acoustic-based identification apparatus 200. In other embodiments, one or more of the audio sensors 210a-210n may be auxiliary to and not integrated with the acoustic-based identification apparatus 200, but may be operatively coupled to the acoustic-based identification apparatus 200 through a wired or wireless connection. For instance, one of more of the audio-sensors 210a-210n may be arranged at designated locations, for example as an array (e.g., 200c, 200d in FIGS. 2C-2D) within the identification boundary 135.

In some embodiments, one or more of the audio sensors 210a-210n may be omnidirectional microphones configured to capture sound from any direction. In some embodiments, one or more of the audio sensors 210a-210n may be a unidirectional microphone that may be configured to capture sound from a predefined direction. In some embodiments, one or more of the audio sensors 210a-210n may be a microphone of any other polarization pattern. The audio sensors 210a-210n may be arranged as a microphone array in the manner described.

The acoustic analyzer 220 may be coupled to the audio sensors 210a-210n and configured to analyze audio signals corresponding to acoustic sound generated by the UAV 110 and captured by the audio sensors 210a-210n. Analyzing the audio signals may refer to processing the audio signals to determine an identity or characteristics of the UAV 110. The data related to the identity of the UAV 110 may be outputted as output signals 260. The identity or type of the UAV 110 may refer to one or more of manufacturer, model, shape, size, number of rotors, or other suitable characteristics associated with the UAV 110. Identifying the UAV 110 may refer to matching the UAV 110 with at least one of multiple different types of UAVs based on the acoustic signature delta. In further embodiments described herein, additional types of data such as, but not limited to, video/image data, infrared/thermal data, radar data, intercepted wireless control communication data, and/or the like may also be used for identifying the UAV.

The acoustic analyzer 220 may include at least a processor 230 and a memory 240 configured for analyzing the audio signals. According to some embodiments, the memory 240 may be a non-transitory processor-readable storage medium that stores processor-executable instructions. The memory 240 may include any suitable internal or external device for storing software and data. Examples of the memory 240 may include, but are not limited to, Random Access Memory (RAM), Read-Only Memory (ROM), floppy disks, hard disks, dongles, or other Recomp Sensor Board (RSB) connected memory devices, or the like. The memory 240 may store an operating system (OS), user application software, and/or executable instructions. The memory 240 may also store application data, such as, but not limited to, an array data structure.

According to some embodiments, the processor 230 may be a general-purpose processor. The processor 230 may include any suitable data processing device, such as, but not limited to, a microprocessor, Central Processor Unit (CPU), or custom hardware. In the alternative, the processor 230 may be any suitable electronic processor, controller, microcontroller, or state machine. The processor 230 may also be implemented as a combination of computing devices (e.g., a combination of a digital signal processor (DSP) and a microprocessor, a plurality of microprocessors, at least one microprocessor in conjunction with a DSP core, or any other suitable configuration).

The acoustic analyzer 220 may be coupled to the database 250 to access data related to the acoustic signature deltas of various UAV identities. The database 250 may be any non-transitory storage medium (such as, but not limited to, the memory 240) storing acoustic data for known acoustic signature deltas generated by the various known UAVs.

Figure 2B:
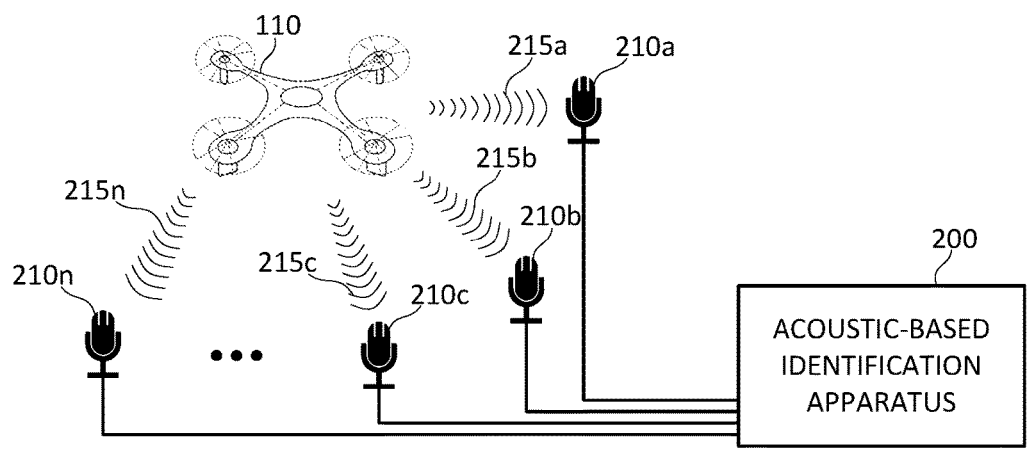
FIG. 2B is a schematic diagram illustrating an example of an acoustic-based identification apparatus according to various embodiments.

FIG. 2B is a schematic diagram illustrating an example audio sensor configuration of the acoustic-based identification apparatus 200 (FIG. 2A) according to various embodiments. Referring to FIGS. 1-2B, the acoustic-based identification apparatus 200 may include or be coupled to the audio sensors 210a-210n, which may be arranged in suitable configurations to capture acoustic sound (audio signals 215a-215n) generated by the UAV 110. In some embodiments, the audio sensors 210a-210n may be spaced apart and positioned in suitable locations in various audio sensor configurations or arrays. Using the audio sensor array to capture the audio signals 215a-215n may allow accurate detection of the audio signals 215a-215n corresponding to the acoustic sound generated by the UAV 110. The audio sensor array, which may include two or more audio sensors, may also be capable of determining a pose (defined by position and orientation of the UAV 110) of the UAV 110 through triangulation/trilateration.

Figure 2C:
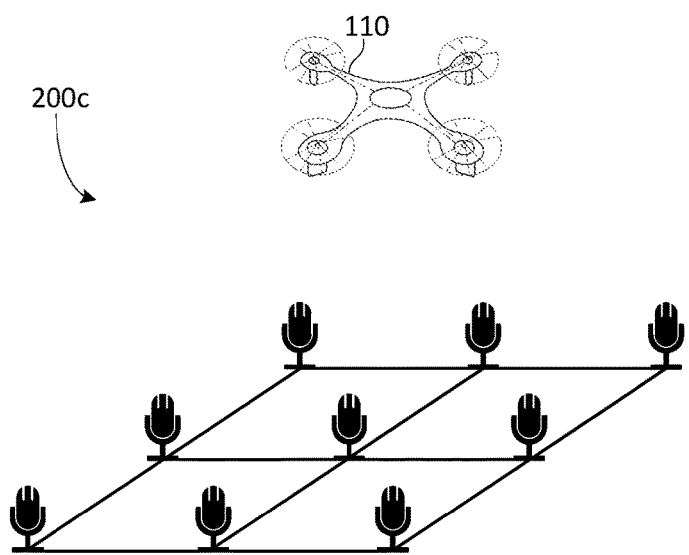
FIG. 2C is a schematic diagram illustrating an example of an audio sensor array according to various embodiments.

FIG. 2C is a schematic diagram illustrating an example of an audio sensor array 200c according to various embodiments. Referring to FIGS. 1-2C, the audio sensor array 200c may be an arrangement of the audio sensors 210a-210n according to various embodiments. The audio sensor array 200c may include audio sensors (e.g., the audio sensors 210a-210n) arranged in a planar configuration (planar array) to capture acoustic sound generated by the UAV 110. The audio sensor array 200c may be a plane parallel or nonparallel to a ground level. At least one additional planar array such as the audio sensor array 200c may be added (in a same or different plane) in further embodiments.

Figure 2D:
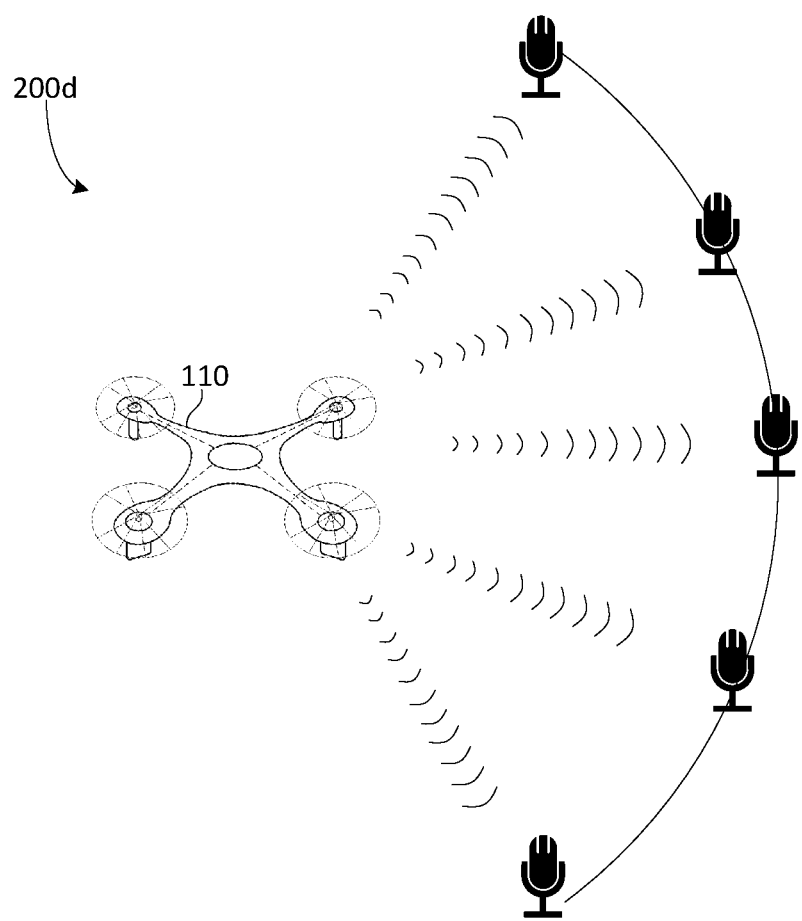
FIG. 2D is a schematic diagram illustrating an example of an audio sensor array according to various embodiments.

FIG. 2D is a schematic diagram illustrating an example of an audio sensor array 200d according to various embodiments. Referring to FIGS. 1-2D, the audio sensor array 200d may correspond to an arrangement of the audio sensors 210a-210n according to various embodiments. The audio sensor array 200d may include audio sensors (e.g., the audio sensors 210a-210n) arranged in a half-dome configuration (or other-shaped configuration) to capture acoustic sounds generated by the UAV 110. The audio sensor array 200d may form a half-dome in a plane parallel or nonparallel to the ground level. At least one additional half-dome such as the audio sensor array 200d may be added (in a same or different plane) in further embodiments.

While the planar audio sensor array 200c and the half-dome audio sensor array 200d are illustrated herein, additional or alternative audio sensor array configuration such as, but not limited to, a Soundfield array, may be implemented.

Figure 6A:
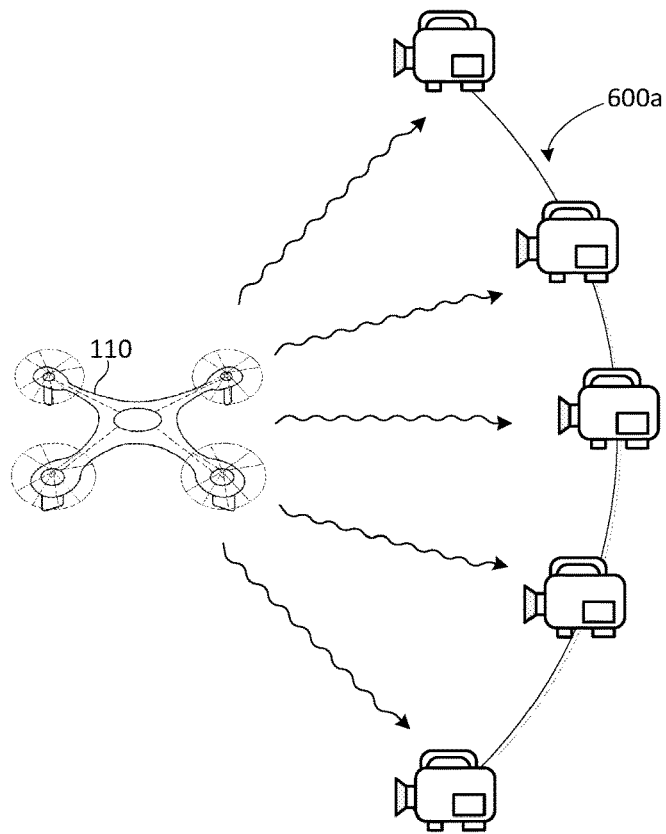
FIG. 6A is a schematic diagram illustrating an example of a visual sensor array according to various embodiments.
Figure 6B:
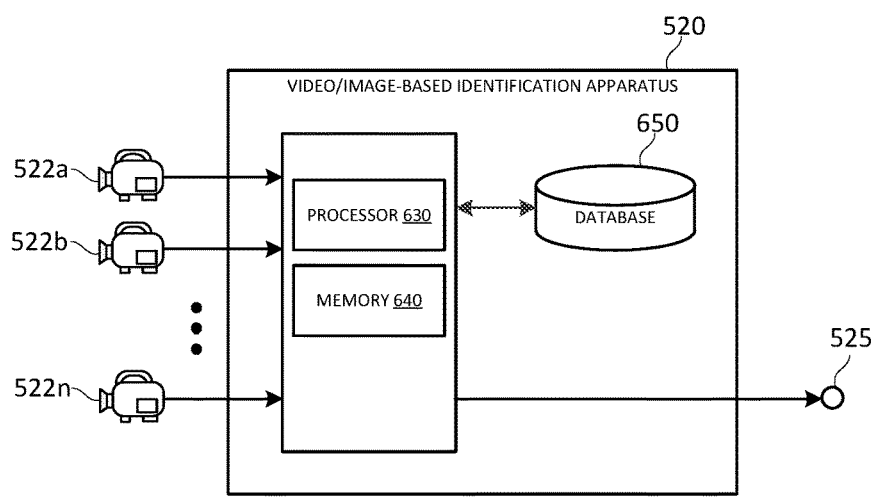
FIG. 6B is a schematic diagram illustrating an example of a video/image-based identification apparatus according to various embodiments.

In some embodiments, another example of the identification apparatus 120 may be a video/image-based identification apparatus (such as, but not limited to, a video/image-based identification apparatus 520 of FIG. 6B. The video/image-based identification apparatus may include at least a plurality of visual sensors 522a-522n, processor 630, memory 640, database 650, and/or the like as shown in FIG. 6B. The visual sensors 522a-522n in FIG. 6B may be arranged in a visual sensor array (such as, but not limited to, a visual sensor array 600a in FIG. 6A). In some embodiments, the acoustic-based identification apparatus 200 may be implemented in conjunction with the video/image-based identification apparatus in the manner described.

Various embodiments of the UAV 110 may be detected using the identification apparatus 120. A flight power source for the UAV 110 may include one or more propellers that generate a lifting force sufficient to lift the UAV 110 (including the UAV structure, motors, rotors, electronics, and power source) and any loads attached thereto. The flight power source may be powered by an electrical power source such as a battery. Alternatively, the flight power source may be a fuel-controlled motor, such as one or more internal combustion motors. While the present disclosure is directed to examples of electric motor controlled UAVs, the concepts disclosed herein may be applied equally to UAVs powered by virtually any power source. Flight power sources may be vertical or horizontally mounted depending on the flight mode of the UAV 110.

An example UAV configuration in various embodiments is a "quad-copter" configuration. In an example quad-copter configuration, typically four (or more or fewer in other embodiments) horizontally configured rotary lift propellers and motors are fixed to a frame. In other examples, UAVs with different numbers, sizes, and shapes of rotors (propellers) may likewise be detectable. Distinctions related to manufacturer, model, shape, size, number of rotors, or the like may substantially contribute to the acoustic sound generated by the UAV 110. Other characteristics of the UAV 110 may also contribute to the acoustic sound generated by the UAV 110. The frame may include a frame structure with landing skids that supports the propulsion motors, power source (e.g., battery), payload securing mechanism, or other structures or devices. A payload may be attached in a central area underneath the frame structure platform of the UAV 110, such as in an area enclosed by the frame structure and skids beneath the flight power sources or propulsion units. The UAV 110 may fly in any unobstructed horizontal and vertical direction or may hover in place.

The UAV 110 may be configured with one or more processing and communication devices that enable the device to navigate, such as by controlling the flight motors to achieve flight directionality and to receive position information and information from other system components including beacons, servers, access points, and so on. The position information may be associated with the current position, way points, flight paths, avoidance paths, altitudes, destination locations, locations of charging stations, etc.

Figure 3A:
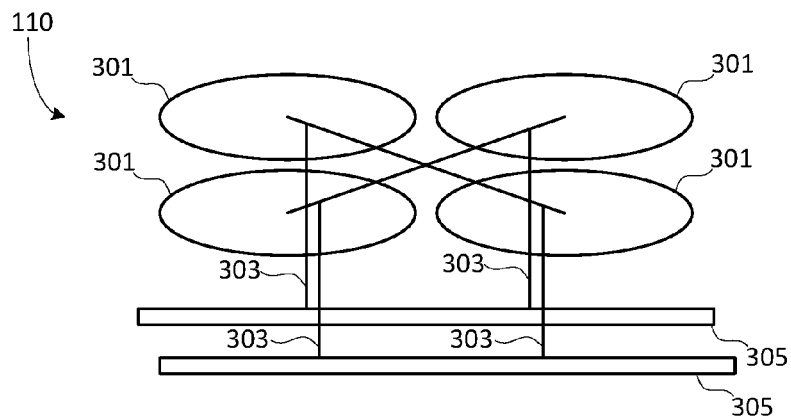
FIG. 3A is a schematic diagram illustrating an example of a UAV suitable for identification by the identification apparatus according to various embodiments.
Figure 3B:
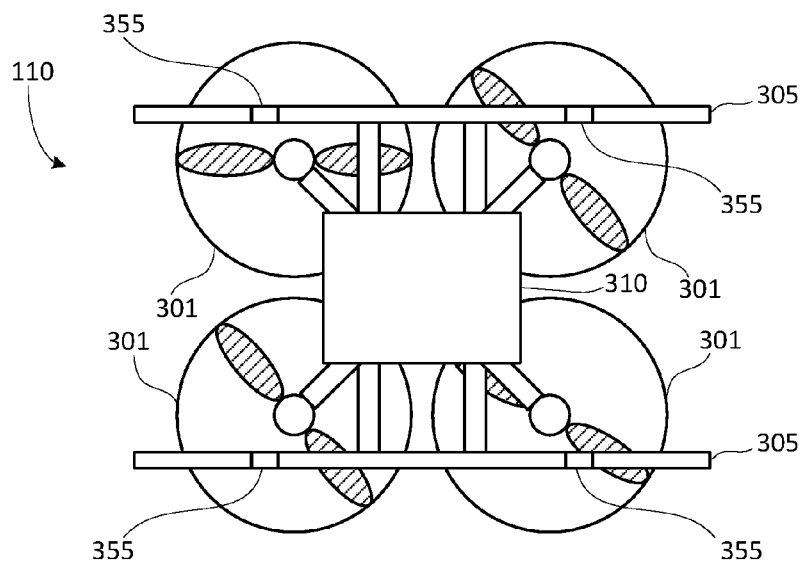
FIG. 3B is a schematic diagram illustrating an example of a UAV suitable for identification by the identification apparatus according to various embodiments.
Figure 3C:
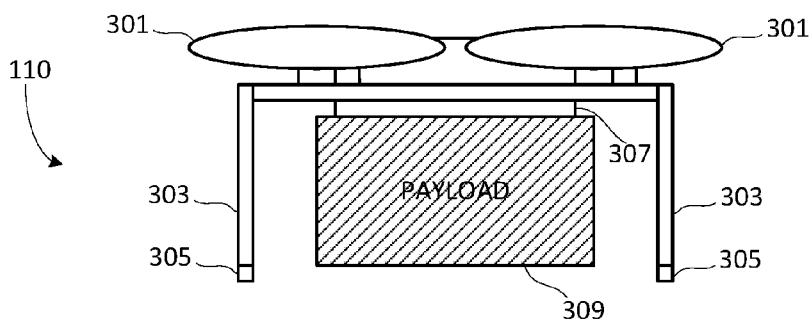
FIG. 3C is a schematic diagram illustrating an example of a UAV suitable for identification by the identification apparatus according to various embodiments.

Referring to FIGS. 3A-3C, in some embodiments, the UAV 110 may include a plurality of rotors 301, a frame 303, and landing skids 305. In the illustrated embodiments, the UAV 110 has four rotors 301. However, in other embodiments, the UAV 110 may have more or fewer than four rotors 301. The frame 303 may provide structural support for the motors associated with the rotors 301, and for the landing skids 305. The frame 303 may be sufficiently strong to support the maximum load weight for the combination of the components of the UAV 110 and, in some cases, a payload 309 (shown in FIG. 2C). For ease of description and illustration, some detailed aspects of the UAV 110 are omitted such as wiring, frame structure interconnects or other features that would be known to one of skill in the art. For example, while the UAV 110 is shown and described as having a frame 303 having a plurality of support members or frame structures, the UAV 110 may be constructed with a unitary frame structure for example, but not limited to, a molded frame in which support for multiple rotors is provided by a single, unitary, molded structure.

In some embodiments, the landing skids 305 of the UAV 110 may be provided with landing sensors 355. The landing sensors 355 may be optical sensors, radio sensors, camera sensors, or other sensors that sense a landing state of the UAV 110. Alternatively or additionally, the landing sensors 355 may be contact or pressure sensors that may provide a signal indicating when the UAV 110 has made contact with a surface. In some embodiments, the landing sensors 355 may be adapted to provide the additional ability to charge a battery when the UAV 110 is positioned on a suitable landing pad, such as through charging connectors. In some embodiments, the landing sensors 355 may provide additional connections with a landing pad (not shown), such as wired communication or control connections. The UAV 110 may further include a control unit 310 that may house various circuits and devices used to power and control the operation of the UAV 110, including motors for powering rotors 301, a battery (e.g., a power module 350), a communication module (e.g., a radio module 330), and so on.

In various embodiments, the UAV 110 may be equipped with a payload-securing unit 307. The payload-securing unit 307 may include an actuator motor that drives a gripping and release mechanism and related controls that are responsive to a control unit to grip and release the payload 309 in response to communications from the control unit.

Figure 3D:
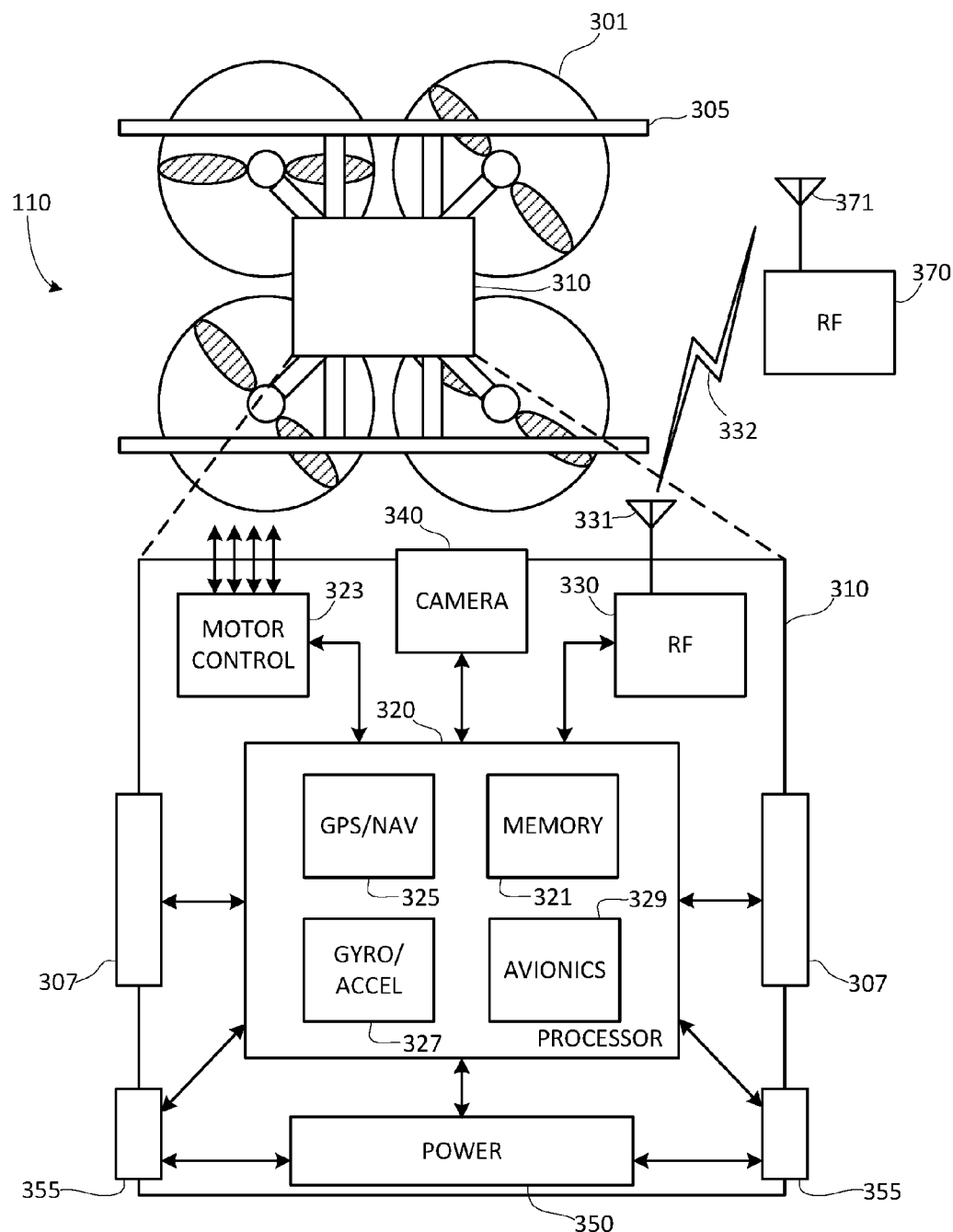
FIG. 3D is a schematic diagram illustrating an example of a UAV suitable for identification by the identification apparatus according to various embodiments.

An example of a control unit 310 for the UAV 110 suitable for use with the various embodiments is illustrated in FIG. 3D. With reference to FIGS. 1-3D, the control unit 310 may include a processor 320, the radio module 330, and the power module 350. The processor 320 may include or be coupled to a memory unit 321 and a navigation unit 325. The processor 320 may be configured with processor-executable instructions to control flight and other operations the UAV 110, including operations of the various embodiments. The processor 320 may be coupled to the payload securing unit 307 and the landing sensors 355. The processor 320 may be powered from a power module 350, such as a battery. The processor 320 may be configured with processor-executable instructions to control the charging of the power module 350, such as by executing a charging control algorithm using a charge control circuit. Alternatively or additionally, the power module 350 may be configured to manage its own charging. The processor 320 may be coupled to a motor control unit 323 that is configured to manage the motors that drive the rotors 301.

Through control of the individual motors of the rotors 301, the UAV 110 may be controlled in flight as the UAV 110 progresses toward a destination. In some embodiments, the navigation unit 325 may send data to the processor 320 and use such data to determine the present position and orientation of the UAV 110, as well as the appropriate course towards the destination. In some embodiments, the navigation unit 325 may include a (Global Navigation Satellite System) GNSS receiver system (e.g., one or more (Global Positioning System) GPS receivers) enabling the UAV 110 to navigate using GNSS signals, and the radio navigation receivers for receiving navigation beacon or other signals from radio nodes, such as navigation beacons (e.g., Very High Frequency (VHF) Omni Directional Radio Range (VOR) beacons), Wi-Fi access points, cellular network sites, radio station, etc. The processor 320 and/or the navigation unit 325 may be configured to communicate with a server (e.g., wireless communication devices 370) through a wireless connection (e.g., a wireless communication link 332) to receive data useful in navigation as well as to provide real-time position reports.

An avionics module 329 coupled to the processor 320 and/or the navigation unit 325 may be configured to provide flight control-related information such as altitude, attitude, airspeed, heading and similar information that the navigation unit 325 may use for navigation purposes, such as dead reckoning between GNSS position updates. The avionics module 329 may include or receive data from a gyro/accelerometer unit 327 that may provide data regarding the orientation and accelerations of the UAV 110 that may be used in navigation calculations.

The radio module 330 may be configured to receive navigation signals, such as beacon signals from restricted areas, signals from aviation navigation facilities, etc., and provide such signals to the processor 320 and/or the navigation unit 325 to assist in navigation of the UAV 110. In some embodiments, the navigation unit 325 may use signals received from recognizable Radio Frequency (RF) emitters (e.g., AM/FM radio stations, Wi-Fi access points, cellular network base stations, etc.) on the ground. The locations, unique identifiers, single strengths, frequencies, and other characteristic information of such RF emitters may be stored in a database and used to determine position (e.g., via triangulation and/or trilateration) when RF signals are received by the radio module 330. Such a database of RF emitters may be stored in the memory unit 321 of the UAV 110, in a ground-based server (e.g., the wireless communication devices 370) in communication with the processor 320 via a wireless communication link (e.g., the wireless communication link 332), or in a combination of the memory unit 321 and a ground-based server. Navigating using information about RF emitters may use any of a number of conventional methods. For example, upon receiving an RF signal via the radio module 330, the processor 320 may obtain the RF signals' unique identifier (e.g., a Service Sector Identification (SSID), a Media Access Control (MAC) address, radio station call sign, cell ID, etc.), and use that information to obtain the ground coordinates and signal strength of the detected RF emitter from the database of RF emitter characteristics. If the database is stored in the onboard memory unit 321, the processor 320 may use the emitter identifier information to perform a table look up in the database. Alternatively or in addition, the processor 320 may use the radio module 330 to transmit the detected RF emitter identifier to a Location Information Service (LIS) server, which may return a location of the RF emitter obtained an RF emitter location database. Using the RF emitters coordinates and optionally the signal strength characteristics, the processor 320 (or the navigation unit 325) may estimate the location of the UAV 110 relative to those coordinates. Using locations of three or more RF emitters detected by the radio module 330, the processor may determine a more precise location via trilateration. Estimates of location based on received ground-based RF emitters may be combined with position information from a GNSS receiver to provide more precise and reliable location estimates than achievable with either method alone.

The processor 320 may use the radio module 330 to conduct wireless communications with a variety of wireless communication devices 370, such as beacon, a server, smartphone, tablet, or other device with which the UAV 110 may be in communication. The bi-directional wireless communication link 332 may be established between transmit/receive antenna 331 of the radio module 330 and transmit/receive antenna 371 of the wireless communication device 370. For example, the wireless communication device 370 may be a beacon that controls access to a restricted area as described herein. In an example, the wireless communication device 370 may be a cellular network base station or cell tower. The radio module 330 may be configured to support multiple connections with different wireless communication devices 370 having different radio access technologies. In some embodiments, the wireless communication device 370 may be connected to a server or may provide access to the server. In an example, the wireless communication device 370 may be a server of a UAV operator, a third party service (e.g., package delivery, billing, etc.), or an operator of a restricted area. The UAV 110 may communicate with the server through an intermediate communication link such as one or more network nodes or other communication devices. The signals received from or sent to the wireless communication device 370, radio nodes, Wi-Fi access points, cellular network sites, radio station, server, and/or the like may be collectively referred to as wireless communication signals.

In some embodiments, the radio module 330 may be configured to switch between a wireless wide area network, wireless local area network, or wireless personal area network connection depending on the location and altitude of the UAV 110. For example, while in flight at an altitude designated for UAV traffic, the radio module 330 may communicate with a cellular infrastructure in order to maintain communications with a server (e.g., 370). An example of a flight altitude for the UAV 110 may be at around 400 feet or less, such as may be designated by a government authority (e.g., FAA) for UAV flight traffic. At this altitude, it may be difficult to establish communication with some of the wireless communication devices 370 using short-range radio communication links (e.g., Wi-Fi). Therefore, communications with other wireless communication devices 370 may be established using cellular telephone networks while the UAV 110 is at flight altitude. Communication between the radio module 330 and the wireless communication device 370 may transition to a short-range communication link (e.g., Wi-Fi or Bluetooth) when the UAV 110 moves closer to the wireless communication device 370.

The wireless communication device 370 may also be a server associated with the operator of the UAV 110, which communicates with the UAV 110 through a local access node or through a data connection maintained through a cellular connection. While the various components of the control unit 310 are illustrated in FIG. 3D as separate components, some or all of the components (e.g., the processor 320, the motor control unit 323, the radio module 330, and other units) may be integrated together in a single device or module, such as a system-on-chip module.

Figure 4A:
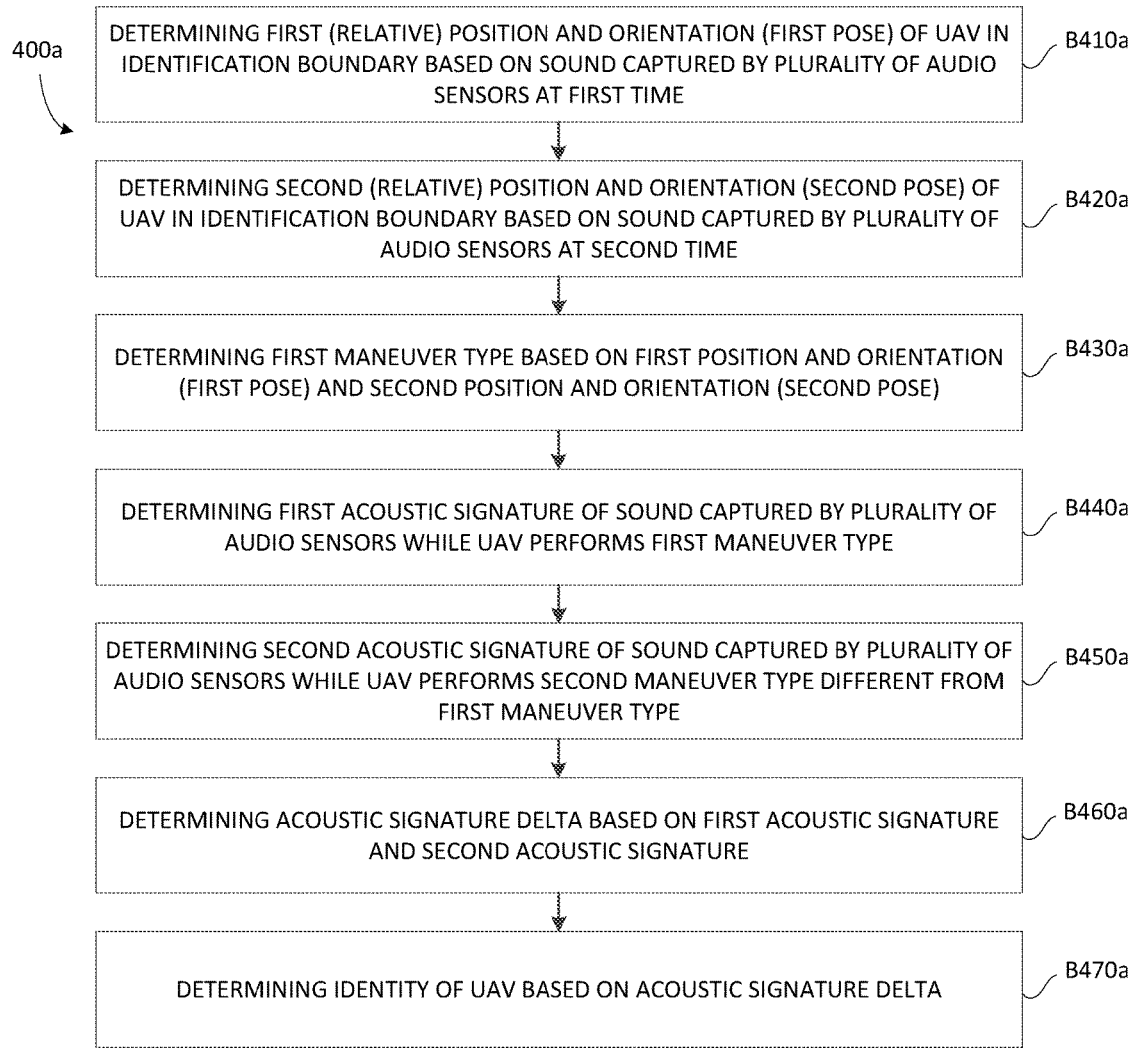
FIG. 4A is a process flow diagram illustrating an example of a UAV identification method using the acoustic-based identification apparatus according to various embodiments.

FIG. 4A is a process flow diagram illustrating an example of a UAV identification method 400a using the acoustic-based identification apparatus 200 (e.g., FIG. 2A) according to various embodiments. In some embodiments, at block B410a, the processor 230 may determine a first relative position and orientation (i.e., a first pose) of the UAV 110 in the identification boundary 135 based on sound captured by the plurality of audio sensors 210a-210n at a first time. For example, the plurality of audio sensors 210a-210n may use triangulation or trilateration to determine the position and orientation of the UAV 110 at any given moment in time (e.g., the first time) while the UAV 110 is within the identification boundary 135. In some embodiments, the first time may correspond to a time at which the plurality of audio sensors 210a-210n first detects any sound from the UAV 110 (i.e., when the UAV 110 first enters the identification boundary 135). In some embodiments, the first time may correspond to a time at which the signal-to-noise ratio for the sound associated with the UAV 110 is above a certain threshold, indicating the first pose can be determined with an acceptable accuracy.

In some embodiments, at block B420a, the processor 230 may determine a second relative position and orientation (i.e., a second pose) of the UAV 110 in the identification boundary 135 based on sound captured by the plurality of audio sensors 210a-210n at a second time. The second time may be later than the first time. In some embodiments, the second time may equal to the first time plus a certain time interval (e.g., 2 s, 5 s, 6 s, 10 s, 15 s, or the like). The processor 230 may automatically trigger the determination of the second pose at the second time. Similarly, the plurality of audio sensors 210a-210n may use triangulation or trilateration to determine the position and orientation of the UAV 110 at the second time while the UAV 110 is within the identification boundary 135.

In some embodiments, at block B430a, the processor 230 may determine a first maneuver type based on the first pose and the second pose. For example, the first maneuver type may be one or more of moving in a straight line, banking left, banking right, ascending, descending, rolling, pitching, yawing, a combination thereof, and the like. Illustrating with a non-limiting example, the first maneuver type may be flying in a straight line from east to west when the first pose is the UAV 110 being at a first position oriented to face west, and the second pose is the UAV 110 being at a second position directly west of the first position. In other words, the first maneuver type may be determined based on one or more of a starting position/orientation (i.e., the first relative position/orientation or pose of the UAV 110) and a next position/orientation (i.e., the second relative position/orientation or pose of the UAV 110).

In some embodiments, at block B440a, the processor 230 may determine a first acoustic signature of the sound captured by the plurality of audio sensors 210a-210n while the UAV 110 performs the first maneuver type, for example, between the first and second time (or some time after the second time). The first acoustic signature may refer to one or more of frequency or amplitude of the sound signals captured while the UAV 110 performs the first maneuver type, such as between the first time and the second time or after the second time (the third time).

In some embodiments, at block B450a, the processor 230 may determine a second acoustic signature of sound capture by the plurality of audio sensors 210a-210n while the UAV 110 performs a second maneuver type different from the first maneuver type. The second acoustic signature may be determined in a manner similar to described with respect to the first acoustic signature in blocks B410a-B440a. The second acoustic signature may refer to one or more of frequency or amplitude of the sound signals captured while the UAV 110 performs the second maneuver type, such as after the second time.

For example, the processor 230 may determine a third pose of the UAV 110 in the identification boundary 135 based on sound captured by the plurality of audio sensors 210a-210n at a third time. The third time may be subsequent to both the first time and the second time in some embodiments. In other embodiments, the third time is the second time (i.e., the second maneuver type directly follow the first maneuver type without any or minimal time gap in between). The processor 230 may then determine a fourth pose of the UAV 110 in the identification boundary 135 based on sound captured by the plurality of audio sensors 210a-210n at a fourth time. The fourth time may be subsequent to the first time, second time, and the third time.

Similarly, the fourth time may equal to the third time plus a certain time interval (e.g., 2 s, 5 s, 6 s, 10 s, 15 s, or the like). The processor 230 may then determine the second maneuver type based on the third pose and the fourth pose similar to described with respect to the first maneuver type. In some embodiments, if the first maneuver type and the second maneuver type are determined to be the same or having a difference that is below a certain threshold, then the processor 230 may re-determine the second maneuver type at a subsequent time interval after the fourth time until the second maneuver type is different from the first maneuver type. Illustrating with a non-limiting example, when the UAV 110 continues to fly in a straight line from east to west, the processor 230 may re-determine the second maneuver type between a fifth time and a sixth time (both subsequent to the fourth time) as a response until the second maneuver type is different from the first maneuver type (e.g., banking 45 degrees to the left). Next, the processor 230 may determine the second acoustic signature corresponding to the second maneuver type in a manner similar to described with respect to the first acoustic signature.

In some embodiments, at block B460*a*, the processor 230 may determine an acoustic signature delta based on the first acoustic signature and the second acoustic signature. In some embodiments, the acoustic signature delta may include a frequency delta (difference between a first frequency associated with the first acoustic signature and a second frequency associated with the second acoustic signature), an amplitude delta (difference between a first amplitude associated with the first acoustic signature and a second amplitude associated with the second acoustic signature), or a combination thereof. In addition or alternatively, other suitable types of acoustic signature delta representing one or more differences between the first acoustic signature and the second acoustic signature may be used.

In some embodiments, at block B470*a*, the processor 230 may determine the identity of the UAV 110 based on the acoustic signature delta. In particular, the processor 230 may compare the acoustic signature delta with known and stored acoustic signature deltas in a database (the database 250). Each of the known and stored acoustic signature deltas may correspond to one of a plurality of UAV identities. In other words, each stored acoustic signature delta may correspond to a particular type of UAV. The processor 230 may select one of the plurality of UAV identities based on a correlated closest (best) match between the acoustic signature delta and the acoustic signature deltas in the database 250. Specifically, the closest match for the UAV identity may be one that best correlates with the acoustic signature delta obtained at block B460*a*. In other embodiments, the processor 230 may select a set of the plurality of UAV identities based on correlated closest matches, for instance.

Figure 4B:
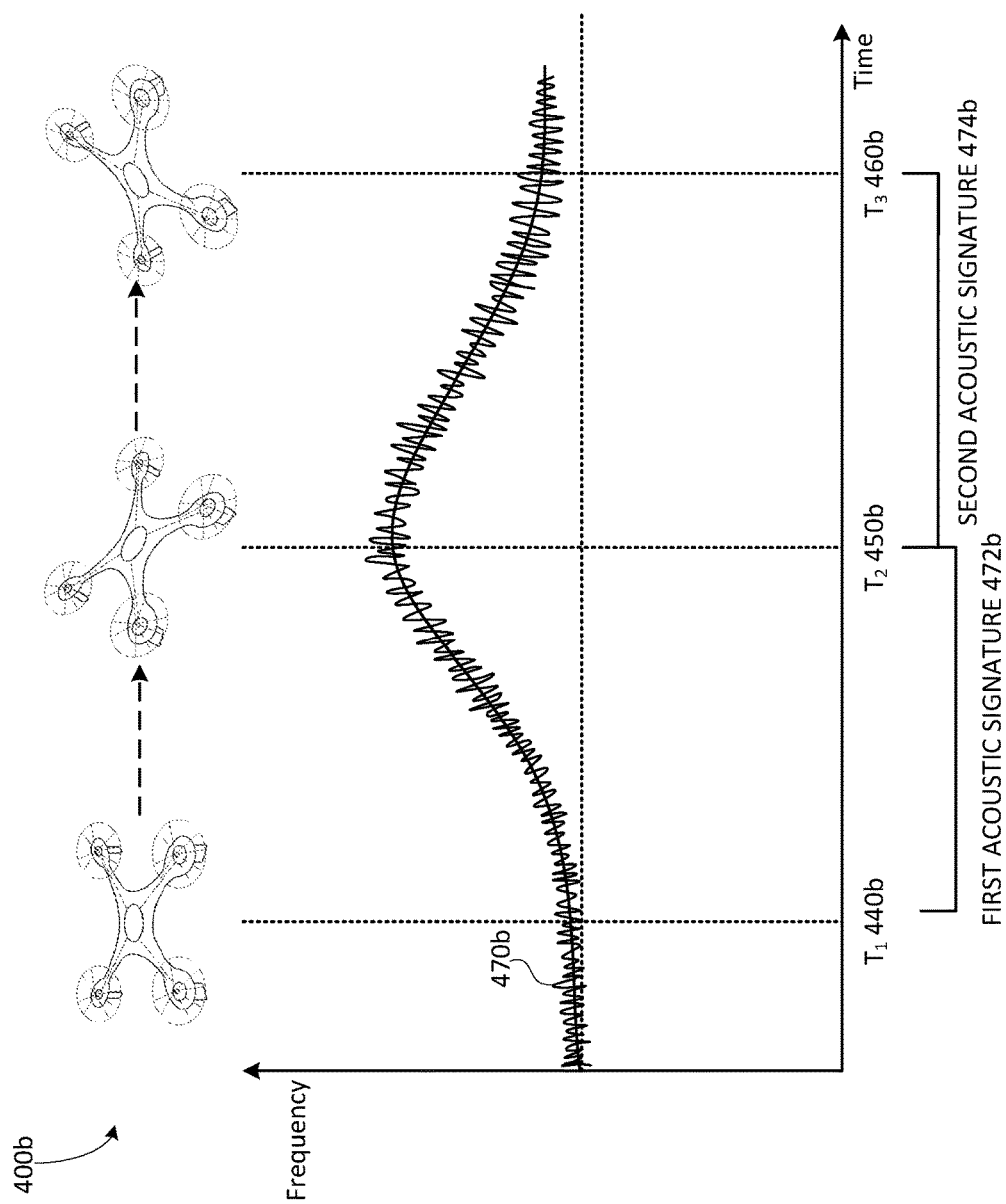
FIG. 4B is a graph (frequency versus time) illustrating an example of acoustic signatures corresponding to maneuver types of a UAV according to various embodiments.

FIG. 4B is a graph 400*b* illustrating an example of audio signals 470*b* corresponding to the sound of the UAV 110 (FIG. 1) captured by the plurality of audio sensors 210*a*-210*n* (FIG. 2A) according to various embodiments. Referring to FIGS. 1-4B, when the UAV 110 performs maneuvers, the UAV 110 may generate sound corresponding to the audio signals 470*b*. The audio signals 470*b* may include a first acoustic signature 472*b* and a second acoustic signature 474*b*. The first acoustic signature 472*b* may be prior in time than the second acoustic signature 474*b*.

The UAV 110 may perform a first maneuver (e.g., banking left) starting from timestamp T$_1$ 440*b* (the first time) and ending at timestamp T$_2$ 450*b* (the second time). The first pose may be determined at timestamp T$_1$ 440*b*. The second pose may be determined at timestamp T$_2$ 450*b*. The first maneuver type may accordingly be determined based on block B430*a*. The time interval between T$_1$ 440*b* and T$_2$ 450*b* may define the first acoustic signature 472*b* associated with the first maneuver type. That is, the audio signatures of the audio signals 470*b* between T$_1$ 440*b* and T$_2$ 450*b* may be the first acoustic signature.

The UAV 110 may perform a second maneuver (e.g., banking right) starting from timestamp T$_2$ 450*b* (the third time, which is the same as the second time in this non-limiting example) and ending at timestamp T$_3$ 460*b* (the fourth time). The third pose may be determined at timestamp T$_2$ 450*b*. The fourth pose may be determined at timestamp T$_3$ 460*b*. The second maneuver type may accordingly be determined based on block B450*a*. The time interval between T$_2$ 450*b* and T$_3$ 460*b* may define the second acoustic signature 474*b* associated with the second maneuver type. That is, the audio signatures of the audio signals 470*b* between T$_2$ 450*b* and T$_3$ 460*b* may be the second acoustic signature.

Figure 5:
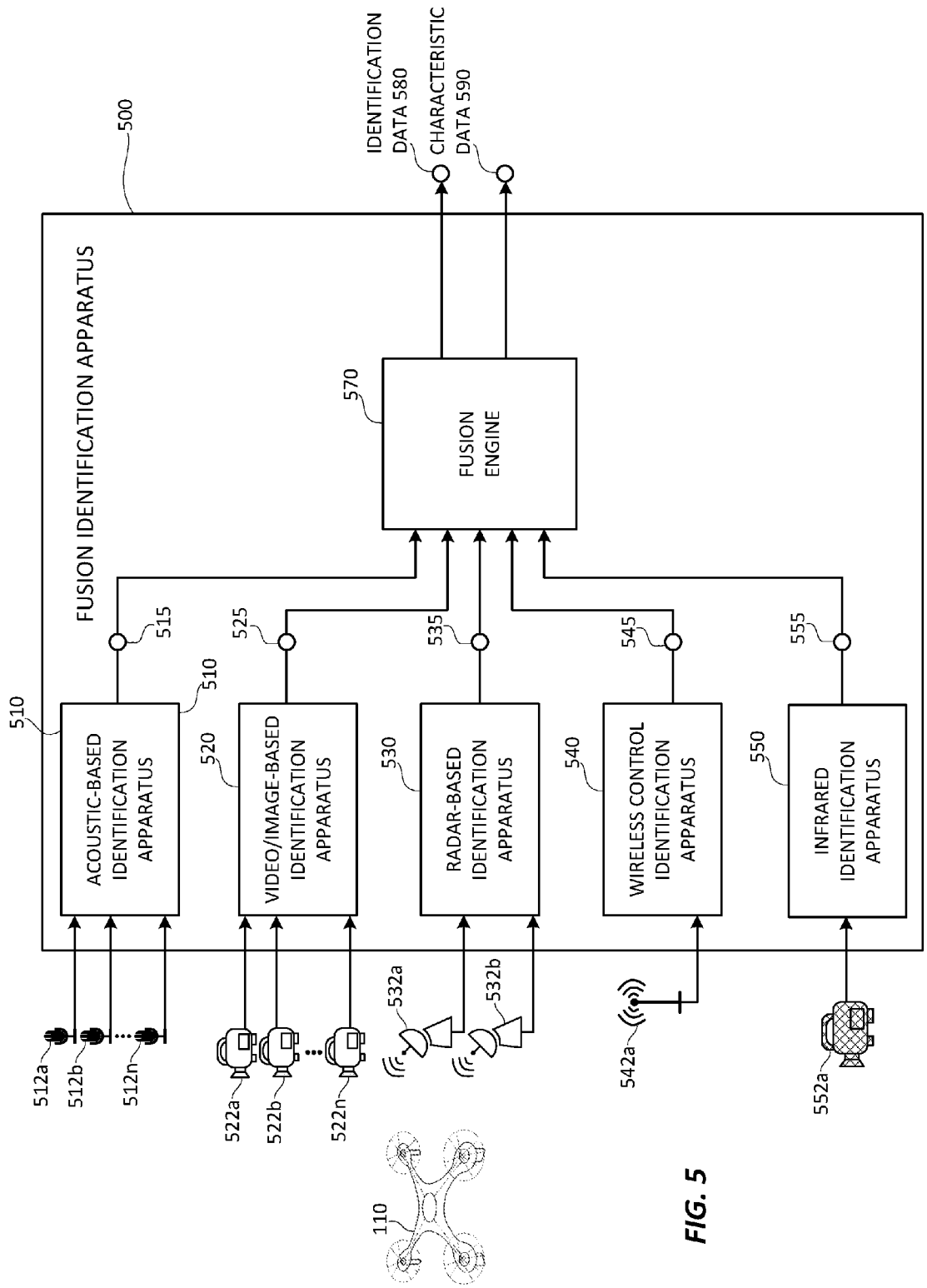
FIG. 5 is a schematic diagram illustrating an example of a fusion identification apparatus according to various embodiments.

FIG. 5 is a schematic diagram illustrating an example of a fusion identification apparatus 500 according to various embodiments. Referring to FIGS. 1-5, the fusion identification apparatus 500 may be an example of the identification apparatus 120 in some embodiments. Particularly, the fusion identification apparatus 500 may include an acoustic-based identification apparatus 510 that corresponds to the acoustic-based identification apparatus 200. The acoustic-based identification apparatus 510 may include audio sensors 512*a*-512*n*, each of which may correspond to a respective one of the audio sensors 210*a*-210*n*. In some embodiments, the acoustic-based identification apparatus 510 may output first identity data 515 including the output signals 260 (i.e., the determined identity of the UAV 110 based on the acoustic-based processes as described). In some embodiments, the first identity data 515 may include a ranked list of "best estimates" based on the processes of the acoustic-based identification apparatus 510. For example, the first identity data 515 may include multiple potential identities for the UAV 110 and correlation coefficients (or other suitable indicators of confidence level) associated with each of these potential identities.

In some embodiments, the fusion identification apparatus 500 may additionally include a video/image-based identification apparatus 520 for determining the identity and/or characteristics of the UAV 110. The video/image-based identification apparatus 520 may include or be coupled at least one visual sensor (e.g., visual sensors 522*a*-522*n*). Each of the visual sensors 522*a*-522*n* may be an image or video-capturing device (e.g., a camera). In particular embodiments, one or more of the visual sensors 522*a*-522*n* may have a wide-angle lens.

The video/image-based identification apparatus 520 may analyze visual data (e.g., video streams) captured by the visual sensors 522*a*-522*n* to determine the identity (or a partial identity) and/or at least some of the characteristics of the UAV 110. For example, UAVs with different manufacturers, models, shapes, sizes, numbers of rotors, or other suitable characteristics may have different visual distinctions (e.g., have different contours in the visual data). Furthermore, the motion vectors corresponding to a given maneuver may also be different depending on the UAV characteristics. The video/image-based identification apparatus 520 may output second identity data 525 including at least one potential identity (or best estimated identity) of the UAV 110 and/or at least some characteristics of the UAV 110. In further embodiments, the second identity data 525 may include a ranked list of "best estimates" based on the processes of the video/image-based identification apparatus 520. For example, the identity data 525 may include multiple potential identities for the UAV 110 and correlation coefficients (or other suitable indicators of confidence level) associated with each of these potential identities.

In various embodiments, the fusion identification apparatus 500 may additionally or alternatively (instead of one of more of the acoustic-based identification apparatus 510 and the video/image-based identification apparatus) include other identification apparatuses for identifying at least some information or characters of the UAV 100.

In some embodiments, the fusion identification apparatus 500 may additionally or alternatively include a radar-based identification apparatus 530 for determining the identity and/or at least some characteristics of the UAV 110. The radar-based identification apparatus 530 may include or be coupled to at least one radar (e.g., first radar 532a, second radar 532b, and/or the like). Each of the at least one radar may be a Continuous Wave (CW) radar. CW radars may include, for example, Doppler radars and Frequency Modulated (FM) radars. Doppler radars can detect existence and velocity of the UAV 110. FM radars can estimate range of the UAV 110. Thus, the combination of Doppler and FM radars can allow determination of the existence, velocity, and range of the UAV 110 simultaneously by a processor (such as, but not limited to, the processor 230). The radar-based identification apparatus 530 may output third identity data 535, which may include at least some characteristics of the UAV 110, such as the existence, velocity, and range of the UAV 110. In addition or alternatively, the third identity data 535 may include at least one potential identity of the UAV 110 determined based on the radar data.

In some embodiments, the fusion identification apparatus 500 may additionally or alternatively include a wireless control identification apparatus 540. The wireless control identification apparatus 540 may include or be coupled to at least one wireless receiver 542a for receiving control signals received by or transmitted from the UAV 110. The wireless control identification apparatus 540 may include a processor (such as, but not limited to, the processor 230) configured to extract control information related to the identity of the UAV 110 from the control signals. The wireless control identification apparatus 540 may output a fourth identity data 545, which includes the identity of the UAV 110 based on the control information. The fourth identity data 545 may include (additionally or alternatively) other suitable information related to the UAV 110 extracted from the control signals.

In some embodiments, the fusion identification apparatus 500 may additionally or alternatively include an infrared identification apparatus 550. The infrared identification apparatus 550 may include or is coupled to at least one infrared or thermal sensor 552 for detecting a thermal signature of the UAV 110. The infrared identification apparatus 550 may complement the video/image-based identification apparatus 520 given that the infrared identification apparatus 550 can be operable after dark. The infrared identification apparatus 550 may include a processor (such as, but not limited to, the processor 230) configured to compute a correlation between the detected heat signature of the UAV 110 with stored heat signatures associated with various UAV identities. The infrared identification apparatus 550 may output a fifth identity data 555 which includes a determined identity of the UAV 110 (one with the highest correlation). In further embodiments, the fifth identity data 555 may include a ranked list of "best estimates" based on the processes of the infrared identification apparatus 550. For example, the fifth identity data 555 may include multiple potential identities for the UAV 110 and correlation coefficients (or other suitable indicators of confidence level) associated with each of these potential identities.

A fusion engine 570 may be used to combine one or more of the identity data (e.g., the first identity data 515, second identity data 525, third identity data 535, fourth identity data 545, and fifth identity data 555) corresponding to various types of sensors to determine identity and characteristics of the approaching UAV 110. Particularly, the identity data 515, 525, 535, 545, and 555 can be correlated to further improve confidence level of the identification and characteristics. In some embodiments, the identity data 515, 525, 535, 545, and 555 may be time-aligned using timestamps. In some embodiments, each of the identity data 515, 525, 535, 545, and 555 may be weighted, for instance, based on the level of correlation associated with a potential UAV identity or based on the type of sensors used in determining the potential UAV identity. The UAV identity with the highest weighted score among all potential UAV identities included in the identity data 515, 525, 535, 545, and 555 may be selected to be the UAV identity for the UAV 110 and outputted in identification data 580. Further characteristics such as, but not limited to, the existence of the UAV 110, speed, direction, range, altitude, and the like may be outputted as the characteristic data 590.

One or more of the identification data 580 and the characteristic data 590 may be provided to a user on a display (not shown) or other indication device, stored (e.g., in a memory or database) for future reference, or the like. In some embodiments, one or more of the identity data 515, 525, 535, 545, and 555 may not include a potential identity or a closest match for the UAV 110. Each of the identity data 515, 525, 535, 545, and 555 may include at least some information and/or characteristics related to the UAV 110 that can be used by components of the fusion identification apparatus 500 to determine the identity of the UAV 110 as described.

Each of the acoustic-based identification apparatus 200, the acoustic-based identification apparatus 510, video/image-based identification apparatus 520, radar-based identification apparatus 530, wireless control identification apparatus 540, infrared identification apparatus 550, and fusion engine 570 may include its own respective processors, memories, and databases for the functions described herein. In other embodiments, two or more of the apparatuses 200, 510, 520, 530, 540, 550, and 570 may share a same processor, memory, and/or databases for performing the functions described herein.

FIG. 6A is a schematic diagram illustrating an example of a visual sensor array 600a according to various embodiments. Referring to FIGS. 1-6A, the visual sensor array 600a may correspond to an arrangement of the visual sensors 522a-522n according to various embodiments. The visual sensor array 600a may include visual sensors (e.g., the visual sensors 522a-522n) arranged in a half-dome configuration (or other-shaped configuration) to capture video streams or images of the UAV 110. The visual sensor array 600a may form a half-dome in a plane parallel or nonparallel to the ground level. At least one additional half-dome such as the visual sensor array 600a may be added (in a same or different plane) in further embodiments. While the half-dome visual sensor array 600a is illustrated herein, additional or alternative visual sensor arrays such as, but not limited to, a planar array, may be implemented.

FIG. 6B is a schematic diagram illustrating an example of the video/image-based identification apparatus 520 according to various embodiments. Referring to FIGS. 1-6B, the video-image-based identification apparatus 520 may include a processor 630, memory 640, and database 650 such as, but not limited to, the processor 230, memory 240, and database 250 of the acoustic-based identification apparatus 220, respectively. The database 650 may store known contours associated various types of UAVs. The database 650 may also store known motion vectors associated with different maneuvers performed by the various types of UAVs. As described, the video/image-based identification apparatus 520 may include or be coupled to the visual sensors 522a-522n and output the second identity data 525.

Figure 7:
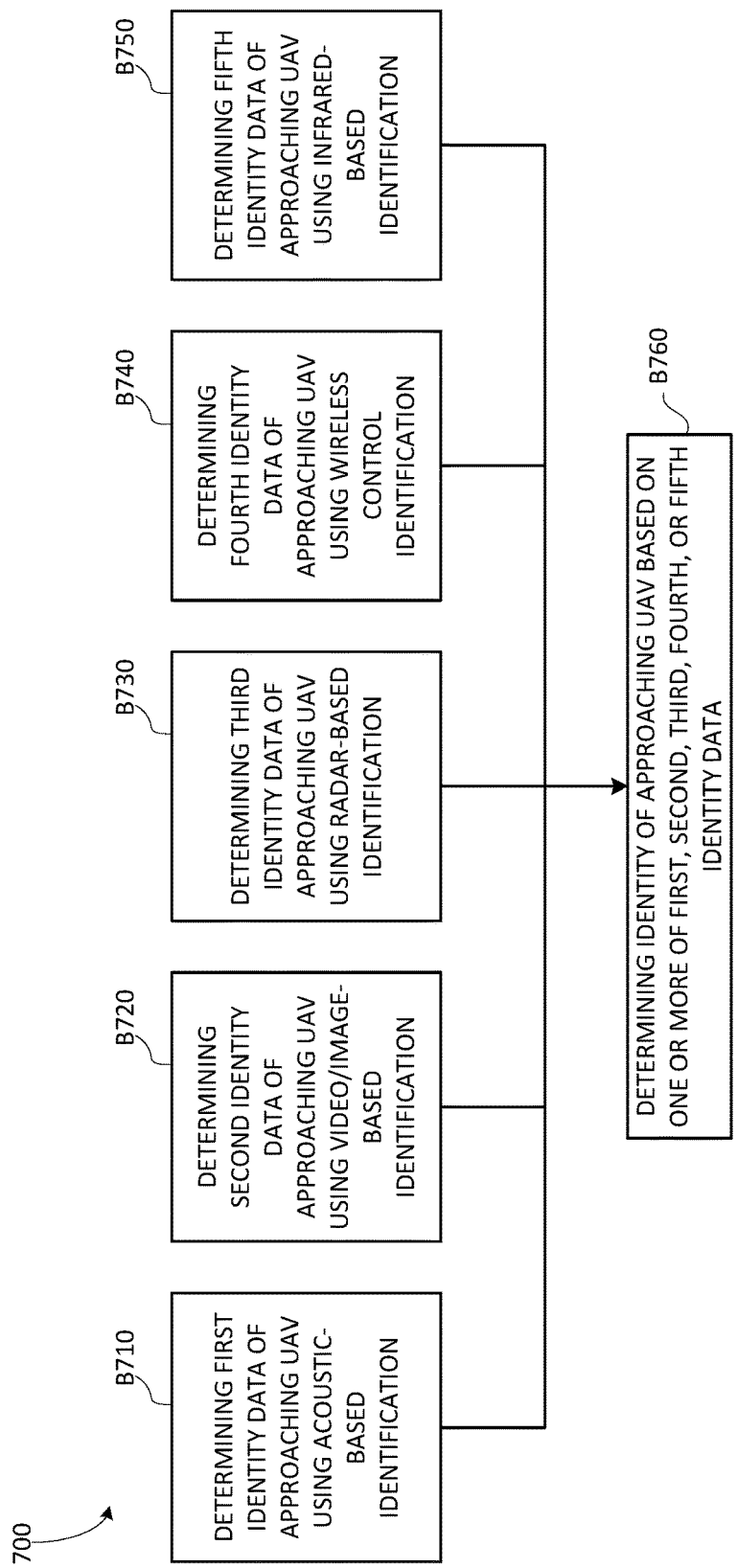
FIG. 7 is a process flow diagram illustrating an example of a UAV identification method using a fusion identification apparatus according to various embodiments.

FIG. 7 is a process flow diagram illustrating an example of a UAV identification method 700 using a fusion identification apparatus according to various embodiments. Referring to FIGS. 1-7, the UAV identification method 700 may be implemented by the fusion identification apparatus 500 according to various embodiments. Blocks B710-B760 are presented for illustrative purposes, and one of ordinary skill in the art would appreciate that embodiments having fewer or additional blocks as compared to blocks B710-B760 may likewise be implemented when feasible and/or desired.

At block B710, the processor 230 of the acoustic-based identification apparatus 510 may be configured to determine the first identity data 515 of the approaching UAV 110 using the acoustic-based identification in the manner described. At block B720, the processor 630 of the video/image-based identification apparatus 520 may be configured to determine the second identity data 525 of the approaching UAV 110 using the video/image-based identification in the manner described.

At block B730, the processor of the radar-based identification apparatus 530 may be configured to determine the third identity data 535 of the approaching UAV 110 using the radar-based identification in the manner described. At block B740, the processor of the wireless control identification apparatus 540 may be configured to determine the fourth identity data 545 of the approaching UAV 110 using the wireless control identification method in the manner described.

At block B750, the processor of the infrared identification apparatus 550 may be configured to determine the fifth identity data 555 of the approaching UAV 110 using the infrared-based identification in the manner described.

At block B760, the processor of the fusion engine 570 may be configured to determine the identity of the approaching UAV 110 based on one or more of the first, second third, fourth, or fifth identity data 515, 525, 535, 545, or 555.

In some embodiments, in response to one of the apparatuses of the fusion identification apparatus 500 determining an existence or presence of the UAV 110 (e.g., the UAV 110 is within the identification boundary 135), one or more of the other apparatuses (or components thereof) may be activated. For example, the existence of the UAV 110 may be determined in response to the acoustic-based identification apparatus 510 determining a particular frequency, maneuver, acoustic signature delta, or acoustic signature that is uniquely associated with UAVs as compared to other flying objects. Illustrating with a non-limiting example, the existence of the UAV 110 may be determined when the captured frequency is within a range of rotor frequencies including frequencies associated with all potential UAVs. In another non-limiting example, the existence of the UAV 110 may be determined by the video/image-based identification apparatus 520 in response to detecting a flying object having an expected size of a UAV, flying in trajectory or pattern similar to that a UAV, and/or other characteristic(s) associated with a UAV. In another non-limiting example, the existence of the UAV 110 may be determined by one or more of the other apparatuses (e.g., the radar-based identification apparatus 530, the wireless control identification apparatus 540 capturing control signals of the UAV 110, the infrared identification apparatus 550 detecting a thermal signature within an acceptable degree of similarity of thermal signatures of UAVs, and/or the like. In response to determining the existence of the UAV 110, one or more other apparatuses may be activated and/or associate their respective data together with the detected UAV 110.

Data from one or more of the apparatuses of the fusion identification apparatus 500 may be associated with one another using timestamps. For example, in response to one of the apparatuses detecting the existence of the UAV 110, a first timestamp may be sent to the other apparatuses to associate their processes, starting from a time indicated by the first timestamp, with the same UAV 110. When one of the apparatuses detects that the UAV 110 is outside of the identification boundary 135 or that the UAV 110 (and/or characteristics thereof) has been at least partially identified, a second timestamp may be sent to other apparatuses. The second timestamp may indicate ending of data collection for the UAV 110. Raw data collected between the first and the second timestamp may be used to determine other identity data (e.g., the first, second third, fourth, and/or fifth identity data 515, 525, 535, 545, and/or 555). The first, second third, fourth, and/or fifth identity data 515, 525, 535, 545, and/or 555 may be sent to the fusion engine 570 for determining the identification data 580 with the associated timestamps. The processor of the fusion engine 570 may be configured to associate the first, second third, fourth, and/or fifth identity data 515, 525, 535, 545, and/or 555 with the corresponding timestamps.

As described herein, each of the first, second third, fourth, and/or fifth identity data 515, 525, 535, 545, and/or 555 may include one or more potential identities and/or characteristics of the UAV 110. The outputted identity (corresponding to the identification data 580) of the fusion identification apparatus 500 may be determined based on a weighted score for each of the potential identities included in the first, second third, fourth, and/or fifth identity data 515, 525, 535, 545, and/or 555. Particularly, the potential identity with the highest weighted score, or the potential identity that crosses a predetermined threshold may be outputted in the identification data 580.

In some embodiments, the weighted score for each of the potential identities may be biased based on the type of sensors and apparatuses used in obtaining the result. Illustrating with a non-limiting example, the weighted score ("S") for a potential identity included in at least one of the first, second third, fourth, and fifth identity data 515, 525, 535, 545, and 555 may be computed by $$S = A^* x_a + B^* x_v + C^* x_r + D^* x_w + E^* x_i \qquad (1)$$

where A is a scaling factor associated with the acoustic-based identification, B is a scaling factor associated with the video/image-based identification, C is a scaling factor associated with the radar-based identification, D is a scaling factor associated with the wireless control identification, and E is a scaling factor associated with the infrared identification. Examples of A-E may include, but not limited to, 0.5, 1, 2, 10, 100, and/or the like. Each of $x_a$, $x_v$, $x_r$, $x_w$, and $x_i$, may represent whether the same identity has been included in each of the first, second third, fourth, and fifth identity data 515, 525, 535, 545, and 555, respectively. In some embodiments, the values of each of the $x_a$, $x_v$, $x_r$, $x_w$, and $x_i$ may be binary (i.e., 0 indicates exclusion and 1 indicates inclusion).

In some embodiments, the scaling factors A-E may be set based on the accuracy of the detection and identification method. For example, B may be higher than A, C, D, and E during the day (compared to at night) given that B may be considered to implement visual identification methods that provide higher degrees of accuracy during daylight hours. In alternative embodiments, the type of sensors and apparatus used does not influence S (e.g., A-E may each be 1).

In some embodiments, the weighted score (S) may be alternatively or additionally biased based on the degree of correlation (e.g., confidence level) associated with the particular potential identity outputted in at least one of the first, second third, fourth, and fifth identity data 515, 525, 535, 545, and 555. For example, each of $x_a$, $x_v$, $x_r$, $x_w$, and $x_i$ may be a value indicating a degree of correlation (e.g., a correlation coefficient or an average correlation value) with the potential identity, instead of a binary number. In particularly embodiments, the more correlated the captured data with the potential identity, the higher the correlation coefficient may be. A higher correlation coefficient may increase the weighted score (S), vice versa.

Figure 8:
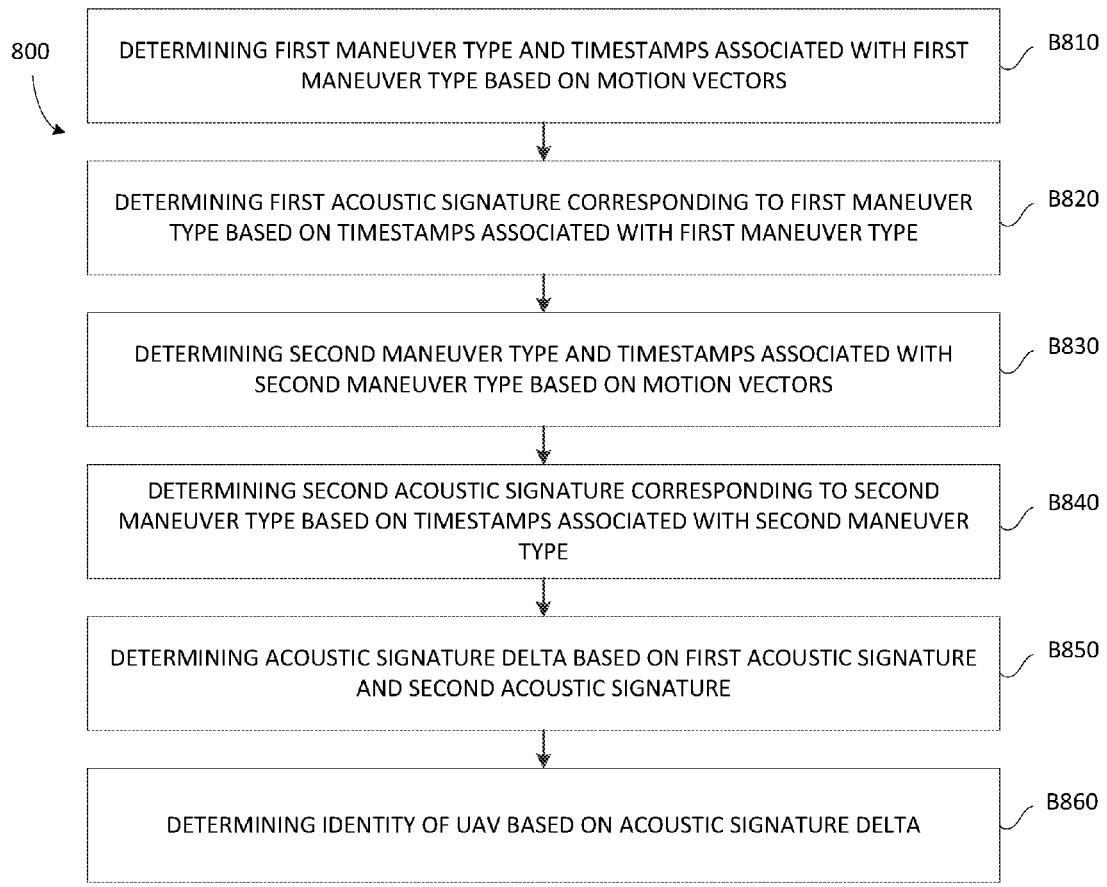
FIG. 8 is a process flow diagram illustrating an example of a UAV identification method using the acoustic-based identification apparatus and the video/image-based identification apparatus according to various embodiments.

FIG. 8 is a process flow diagram illustrating an example of a UAV identification method 800 using the acoustic-based identification apparatus (200, 510 in FIGS. 2 and 5) and the video/image-based identification apparatus 520 (FIGS. 5 and 6B) according to various embodiments. Referring to FIGS. 1-8, the processor 630 of the video/image-based identification apparatus 520 may be configured to determine the first maneuver type based on the motion vectors associated with the UAV 110, at block B810, in some embodiments.

For example, the processor 630 may be configured to match the motion vectors of the UAV 110 with a known/stored set of motion vectors associated with a particular maneuver type in response to determining that a size of the at least one object in the video streams corresponds to a size of a UAV. That is, the processor 630 may identify the first maneuver type performed by the UAV 110 by selecting one from a plurality of potential maneuver types based on correlation with the captured motion vectors of the UAV 110. When the first maneuver type is identified, a timestamp is stored (in the memory 240 and/or the memory 640) for the beginning of the first maneuver and another time stamp is stored (in the memory 240 and/or the memory 640) for the end of the first maneuver. The timestamps may be sent to or accessed by the processor 230 of the acoustic-based identification apparatus 200 (510). Illustrating with a non-limiting example, the processor 630 may determine that the motion vectors from the visual data captured by the visual sensor array 600a are consistent with banking left (e.g., the first maneuver type in FIG. 4B). The processor 630 may store $T_1$ 440b and $T_2$ 450b in the memory 240 and/or the memory 640.

In some embodiments, the processor 230 of the acoustic-based identification apparatus 200 may determine the first acoustic signature corresponding to the first maneuver type, at block B820. The first acoustic signature may be determined based on the timestamps associated with the first maneuver type. Returning to the non-limiting example, based on $T_1$ 440b and $T_2$ 450b determined by the processor 630, the processor 230 can determine the first acoustic signature 472b corresponding to the first maneuver type. The first acoustic signature 472b may be the acoustic signature between $T_1$ 440b and $T_2$ 450b

In some embodiments, at block B830, the processor 630 of the video/image-based identification apparatus 520 may determine the second maneuver type associated with the second maneuver type based on the motion vectors in a manner similar to described with respect to the first maneuver type at block B810. In some embodiments, at block B840, the processor 230 of the acoustic-based identification apparatus 200 may determine the second acoustic signature 474b corresponding to the second maneuver type in a manner similar to described with respect to the first acoustic signature at block B820. For example, the second acoustic signature 474b may be determined based on the timestamps ($T_2$ 450b and $T_3$ 460b) associated with the second maneuver type.

Thus, the first and second maneuver types of the UAV 110 may be identified by the video/image-based identification apparatus 520 (and/or via other apparatuses) instead of the acoustic-based identification apparatus 200. Each of blocks B810 and B830 may be repeated until the first and second maneuver types can be determined or a best maneuver type match can be found. In further embodiments, both the video/image-based identification apparatus 520 and the acoustic-based identification apparatus 200 may be configured to determine the first and second maneuver types for improved accuracy. In such embodiments, each of blocks B810 and B830 may be repeated until both apparatuses 200 and 520 select the same maneuver type for each of the first and second maneuver types.

In some embodiments, at block B850, the processor 230 of the acoustic-based identification apparatus 200 may determine the acoustic signature delta based on the first acoustic signature and the second acoustic signature in a manner similar to described with respect to block B460a. In some embodiments, at block B860, the processor 230 of the acoustic-based identification apparatus 200 may determine the identity of the UAV 110 based on the acoustic signature delta in a manner similar to described with respect to block B470a.

In some embodiments, the processor 230 and the processor 630 may be a same processor. In other embodiments, the processor 230 and the processor 630 are separate processors. In some embodiments, the memory 240 and the memory 640 may be a same memory. In other embodiments, the memory 240 and the memory 640 are different memories. In further embodiments, one or more processes described with respect to the methods 400a, 700, 800, and the like) described herein may be implemented with machine learning.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for identifying an Unmanned Aerial Vehicle (UAV), the method comprising:
   determining a first maneuver type;
   determining a first acoustic signature of sound captured by a plurality of audio sensors while the UAV performs the first maneuver type;
   determining a second acoustic signature of sound captured by the plurality of audio sensors while the UAV performs a second maneuver type different from the first maneuver type;
   determining a difference between the first acoustic signature and the second acoustic signature; and
   determining an identity of the UAV based on the determined difference.

2. The method of claim 1, wherein each of the first acoustic signature and the second acoustic signature is determined based on sound corresponding to the first acoustic signature and the second acoustic signature of the UAV captured with the plurality of audio sensors.

3. The method of claim 1, wherein the plurality of audio sensors is configured as a microphone array.

4. The method of claim 1, wherein determining the first maneuver type comprises:
   determining a first relative position and orientation of the UAV based on sound captured by the plurality of audio sensors;
   determining a second relative position and orientation of the UAV based on the sound captured by the plurality of audio sensors; and
   determining the first maneuver type based on the first relative position and orientation of the UAV and the second relative position and orientation of the UAV.

5. The method of claim 1, wherein determining the second maneuver type comprises:
   determining a third relative position and orientation of the UAV based on sound captured by the plurality of audio sensors;
   determining a fourth relative position and orientation of the UAV based on the sound captured by the plurality of audio sensors; and
   determining the second maneuver type based on the third relative position and orientation of the UAV and the fourth relative position and orientation of the UAV.

6. The method of claim 1, wherein the first maneuver type associated with the first acoustic signature is determined based on motion vectors of the UAV captured with at least one visual sensor.

7. The method of claim 1, further comprising:
   determining at least one timestamp associated with the first maneuver type; and
   determining the first acoustic signature based on the at least one timestamp.

8. The method of claim 1, wherein the second maneuver type associated with the second acoustic signature is determined based on motion vectors of the UAV captured by at least one visual sensor.

9. The method of claim 1, further comprising:
determining at least one timestamp associated with the second maneuver type; and
determining the second acoustic signature based on the at least one timestamp.

10. The method of claim 1, wherein each of the first maneuver type and the second maneuver type comprises one or more of moving in a straight line, banking left, banking right, ascending, descending, rolling, pitching, or yawing.

11. The method of claim 1, wherein the UAV is identified based on the acoustic signature delta by correlating the acoustic signature delta with a plurality of stored acoustic signature deltas associated with a plurality of UAV identities.

12. The method of claim 1, further comprising:
determining at least one motion vector for the UAV;
determining first identity data identifying the UAV based on the acoustic signature delta;
determining second identity data identifying the UAV based on the at least one motion vector; and
correlating the first identity data with the second identity data to determine the identity of the UAV.

13. The method of claim 12, wherein determining the at least one motion vector for the UAV comprises:
receiving video stream data corresponding to the UAV from at least one visual sensor; and
determining the at least one motion vector of the UAV based on the video stream data.

14. The method of claim 12, wherein determining the second identity data based on the at least one motion vector comprises correlating the at least one motion vector with a plurality of stored motion vectors associated with a plurality of UAV identities.

15. The method of claim 12, wherein the first identity data and the second identity data are time-aligned for the correlation based on a timestamp associated with the first identity data and a timestamp associated with the second identity data.

16. The method of claim 12, further comprising:
determining third identity data based on radar data associated with the UAV; and
correlating one or more of the first identity data, the second identity data, and the third identity data to determine the identity of the UAV.

17. The method of claim 12, further comprising:
determining third identity data based on wireless communication signals associated with the UAV; and
correlating one or more of the first identity data, the second identity data, and the third identity data to determine the identity of the UAV.

18. The method of claim 12, further comprising:
determining third identity data based on infrared or thermal data associated with the UAV; and
correlating one or more of the first identity data, the second identity data, and the third identity data to determine the identity of the UAV.

19. The method of claim 1, further comprising:
determining information relating to the UAV;
determining first identity data identifying the UAV based on the acoustic signature delta;
determining second identity data identifying the UAV based on the determined information; and
correlating the first identity data with the second identity data to determine the identity of the UAV.

20. The method of claim 1, wherein the identity of the UAV comprises information relating to a manufacturer, model, shape, size, or number of rotors of the UAV.

21. The method of claim 1, wherein the identity of the UAV includes information relating to characteristics of the UAV.

22. An identification apparatus configured to determine an identity associated with an Unmanned Aerial Vehicle (UAV), the identification apparatus comprising:
an acoustic-based identification apparatus comprising a first processor configured to:
determine a first maneuver type;
determine a first acoustic signature of sound captured by a plurality of audio sensors while the UAV performs the first maneuver type;
determine a second acoustic signature of sound captured by the plurality of audio sensors while the UAV performs a second maneuver type different from the first maneuver type;
determine a difference between the first acoustic signature and the second acoustic signature; and
determine the identity of the UAV based on the determined difference.

23. The identification apparatus of claim 22, further comprising a video/image-based identification apparatus including:
a visual sensor array configured to capture visual data corresponding to the UAV; and
a second processor configured to:
determine at least one motion vector associated with motion of the UAV from the visual data; and
output second identity data identifying the UAV based on the at least one motion vector; and
a fusion engine configured to identify the UAV based on both the first identity data and the second identity data.

24. The identification apparatus of claim 23, wherein the first maneuver type is identified based on the at least one motion vector of the UAV captured with the visual sensor array.

25. The identification apparatus of claim 22, wherein the first processor is further configured to determine the first maneuver type by:
determining a first relative position and orientation of the UAV based on sound captured by a plurality of audio sensors;
determining a second relative position and orientation of the UAV based on the sound captured by the plurality of audio sensors; and
determining the first maneuver type based on the first relative position and orientation of the UAV and the second relative position and orientation of the UAV.

26. The identification apparatus of claim 22, wherein the first processor identifies the UAV based on the acoustic signature delta by correlating the acoustic signature delta with a plurality of stored acoustic signature deltas associated with a plurality of UAV identities.

27. The identification apparatus of claim 22, wherein the acoustic-based identification apparatus further comprises an audio sensor array comprising the plurality of audio sensors configured to capture the sound generated by the UAV.

28. A non-transitory computer-readable medium containing processor-readable instructions such that, when executed, cause a processor of an identification apparatus to perform a process to identify an Unmanned Aerial Vehicle (UAV), the process comprising:
determining a first maneuver type;
determining a first acoustic signature of sound captured by a plurality of audio sensors while the UAV performs the first maneuver type;

determining a second acoustic signature of sound captured by the plurality of audio sensors while the UAV performs a second maneuver type different from the first maneuver type;

determining a difference between the first acoustic signature and the second acoustic signature; and determining an identity of the UAV based on the determined difference.

29. An apparatus configured to determine an identity of an Unmanned Aerial Vehicle (UAV), the identification apparatus comprises:

means for determining a first maneuver type;

means for determining a first acoustic signature of sound captured by a plurality of audio sensors while the UAV performs the first maneuver type;

means for determining a second acoustic signature of sound captured by the plurality of audio sensors while the UAV performs a second maneuver type different from the first maneuver type;

means for determining a difference between the first acoustic signature and the second acoustic signature; and means for determining an identity of the UAV based on the determined difference.

* * * * *